(12) United States Patent
Zhang et al.

(10) Patent No.: US 11,895,696 B2
(45) Date of Patent: Feb. 6, 2024

(54) INFORMATION TRANSMISSION METHOD AND APPARATUS

(71) Applicant: Huawei Technologies Co., Ltd., Shenzhen (CN)

(72) Inventors: Lili Zhang, Beijing (CN); Jiayin Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 383 days.

(21) Appl. No.: 17/169,763

(22) Filed: Feb. 8, 2021

(65) Prior Publication Data

US 2021/0168855 A1 Jun. 3, 2021

Related U.S. Application Data

(63) Continuation of application No. PCT/CN2019/098803, filed on Aug. 1, 2019.

(30) Foreign Application Priority Data

Aug. 7, 2018 (CN) .......................... 201810892501.3

(51) Int. Cl.
*H04W 74/00* (2009.01)
*H04W 72/12* (2023.01)
(Continued)

(52) U.S. Cl.
CPC ..... *H04W 74/004* (2013.01); *H04W 72/1215* (2013.01); *H04W 72/21* (2023.01); *H04W 74/0816* (2013.01)

(58) Field of Classification Search
CPC .......... H04W 74/004; H04W 74/0816; H04W 72/21; H04W 72/1215
(Continued)

(56) References Cited

U.S. PATENT DOCUMENTS

2016/0050667 A1* 2/2016 Papasakellariou .......................... H04W 52/0251
370/329
2016/0315681 A1* 10/2016 Moon ............... H04W 74/0816
(Continued)

FOREIGN PATENT DOCUMENTS

| CN | 106851839 A | 6/2017 |
|---|---|---|
| CN | 107872847 A | 4/2018 |

(Continued)

OTHER PUBLICATIONS

Huawei, "NR frame structure on unlicensed bands," 3GPP TSG RAN WG1 Meeting #93, R1-1805917, Busan, Korea, May 21-25, 2018, 8 pages.
(Continued)

*Primary Examiner* — Chi Tang P Cheng
(74) *Attorney, Agent, or Firm* — Conley Rose, P.C.

(57) ABSTRACT

An information transmission method and an apparatus, where the method includes: sending first indication information to a terminal, where the first indication information is used to indicate a format configuration of one or more time units in first time duration, where the format configuration is a time domain structure configuration of the one or more time units in a transmission direction, where the first time duration is not greater than second time duration, and where the second time duration is a maximum channel occupancy time of a network device.

20 Claims, 8 Drawing Sheets

(51) Int. Cl.
   *H04W 74/08*   (2009.01)
   *H04W 72/21*   (2023.01)

(58) Field of Classification Search
   USPC .......................................................... 370/329
   See application file for complete search history.

(56) References Cited

U.S. PATENT DOCUMENTS

| | | | |
|---|---|---|---|
| 2017/0163388 | A1* | 6/2017 | Wiemann ............... H04L 1/1822 |
| 2017/0238342 | A1 | 8/2017 | Yang et al. |
| 2018/0042048 | A1 | 2/2018 | Hugl et al. |
| 2019/0116489 | A1 | 4/2019 | Harada et al. |
| 2019/0289621 | A1 | 9/2019 | Li et al. |
| 2019/0357224 | A1 | 11/2019 | Li et al. |

FOREIGN PATENT DOCUMENTS

| | | |
|---|---|---|
| CN | 108282879 A | 7/2018 |
| EP | 3547587 A | 2/2019 |
| WO | 2017170814 A1 | 10/2017 |
| WO | 2018103702 A1 | 6/2018 |

OTHER PUBLICATIONS

"3rd Generation Partnership Project; Technical Specification Group Radio Access Network; Physical layer procedures for shared spectrum channel access (Release 15)," 3GPP TS 37.213 V15.0.0, Jun. 2018, 20 pages.
"3rd Generation Partnership Project; Technical Specification Group Radio Access Network; NR; Multiplexing and channel coding (Release 15)," 3GPP TS 38.212 V15.2.0, Jun. 2018, 98 pages.
"3rd Generation Partnership Project; Technical Specification Group Radio Access Network; NR; Physical layer procedures for control (Release 15)," 3GPP TS 38.213 V15.2.0, Jun. 2018, 99 pages.
"3rd Generation Partnership Project; Technical Specification Group Radio Access Network; NR; Physical layer procedures for data (Release 15)," 3GPP TS 38.214 V15.2.0, Jun. 2018, 95 pages.
R1-1806105, Nokia, et al., "Frame structure for NR-U operation," 3GPP TSG RAN WG1 Meeting #93, Busan, Korea, May 21-25, 2018, 6 pages.
R1-1806761, Samsung, "Channel access procedures for NR-U," 3GPP TSG-RAN WG1 Meeting #93, Busan, Korea, May 21-25, 2018, 5 pages.
R1-1807386, Qualcomm Incorporated, "TxOP Frame Structure for NR unlicensed," 3GPP TSG RAN WG1 Meeting #93, Busan, Korea, May 20-May 25, 2018, 8 pages.
Tdoc R2-1707120, Ericsson, "Prioritization in MAC," 3GPP TSG-RAN WG2 #98-AH, Qingdao, P.R. of China, Jun. 27-29, 2017, 4 pages.
R2-1705566, Huawei et al., Configuration of priority order between data and MAC CE, 3GPP TSG-RAN WG2 #98, Hangzhou, China, May 15-19, 2017, 2 pages.

* cited by examiner

INFORMATION TRANSMISSION METHOD AND APPARATUS

CROSS-REFERENCE TO RELATED APPLICATIONS

This application is a continuation of International Patent Application No. PCT/CN2019/098803, filed on Aug. 1, 2019, which claims priority to Chinese Patent Application No. 201810892501.3, filed on Aug. 7, 2018. The disclosures of the aforementioned applications are hereby incorporated by reference in their entireties.

TECHNICAL FIELD

This application relates to wireless communications technologies, and in particular, to an information transmission method and an apparatus.

BACKGROUND

In a communications system deployed based on an unlicensed spectrum, each node determines a busy or idle state of the unlicensed spectrum based on a value of receive power in the unlicensed spectrum. If the value of the receive power is less than a specific threshold, it is considered that there is no interference source in the unlicensed spectrum and the unlicensed spectrum is in the idle state. In this case, a signal may be sent in the unlicensed spectrum. This mechanism of monitoring before sending is referred to as listen before talk (LBT), which can avoid a conflict that occurs between the nodes when unlicensed spectrum resources are used. Because each node uses/shares a radio resource through contention, a transmission start moment in the unlicensed spectrum is not fixed. In addition, a frequency domain channel width occupied by each transmission also varies with a clear channel assessment result, a maximum channel occupancy time of one transmission is also limited, and a channel occupancy time of each transmission cannot be dynamically indicated to the nodes.

Currently, in a Wi-Fi system, control information including a transmit opportunity (TXOP) is included in a header of each data packet. The TXOP is used to indicate a bandwidth used for transmission of the data packet, time duration for the transmission of the data packet, and remaining TXOP time duration after the transmission of the data packet is completed. Although the remaining TXOP time duration may be dynamically updated and indicated, an uplink/downlink configuration of a subframe within a remaining channel occupancy time cannot be dynamically indicated, and a terminal consumes power because the terminal still needs to continuously monitor control information. Consequently, an energy loss is caused.

SUMMARY

Embodiments of this application provide an information transmission method and an apparatus, to dynamically indicate a time domain structure configuration in a transmission direction corresponding to a time unit, and determine an available time unit based on the time domain structure configuration, such that a terminal learns of the time domain structure configuration in advance, and does not need to continuously monitor control information, thereby saving energy. In addition, the determined available time unit may be reported, such that a network device performs effective scheduling, thereby preventing incorrect scheduling.

To achieve the foregoing technical objective, the embodiments of this application provide the following technical solutions.

A first aspect of the embodiments of this application provides an information transmission method, including: A network device sends first indication information to a terminal. The first indication information is used to indicate a format configuration of one or more time units in first time duration, the format configuration is a time domain structure configuration of the one or more time units in a transmission direction, the first time duration is less than or equal to second time duration, and the second time duration is a channel occupancy time of the network device. It may be learned from the technical solution of the first aspect that the network device sends the format configuration of the one or more time units to the terminal, namely, an indication of the time domain structure of the one or more time units in the transmission direction. Therefore, the terminal may learn in advance of a time segment (or time period/interval) for sending or receiving data, such that the terminal needs to send or receive data only in the time segment indicated by the first indication information, and does not need to continuously monitor control information, thereby saving energy of the terminal.

Optionally, the second time duration may be a maximum channel occupancy time of the network device, or may be an occupancy time less than a maximum channel time.

Optionally, the information transmission method in the first aspect is applicable to an unlicensed spectrum system. For example, the first indication information may be indication information in an unlicensed spectrum, and the first indication information may be sent by the network device to the terminal in the unlicensed spectrum.

A second aspect of the embodiments of this application provides an information transmission method, including: A terminal receives first indication information sent by a network device. The first indication information is used to indicate a format configuration of one or more time units in first time duration, the format configuration is a time domain structure configuration of the one or more time units in a transmission direction, the first time duration is less than or equal to second time duration, and the second time duration is a channel occupancy time of the network device. It may be learned from the technical solution of the second aspect that the network device sends the format configuration of the one or more time units to the terminal, namely, an indication of the time domain structure of the one or more time units in the transmission direction. Therefore, the terminal may learn in advance of a time segment for sending or receiving data, such that the terminal needs to send or receive data only in the time segment indicated by the first indication information, and does not need to continuously monitor control information, thereby saving energy of the terminal.

Optionally, the second time duration may be a maximum channel occupancy time of the network device, or may be an occupancy time less than a maximum channel time.

Optionally, the information transmission method in the second aspect is applicable to an unlicensed spectrum system. For example, the first indication information may be indication information in an unlicensed spectrum, and the first indication information may be sent by the network device to the terminal in the unlicensed spectrum.

A third aspect of the embodiments of this application provides a network device, and the network device has a function of implementing the method according to any one of the first aspect or the possible implementations of the first aspect. The function may be implemented by hardware, or may be implemented by hardware executing corresponding software. The hardware or the software includes one or more modules corresponding to the function.

A fourth aspect of the embodiments of this application provides a terminal, and the terminal has a function of implementing the method according to any one of the second aspect or the possible implementations of the second aspect. The function may be implemented by hardware, or may be implemented by hardware executing corresponding software. The hardware or the software includes one or more modules corresponding to the function.

A fifth aspect of the embodiments of this application provides a network device, including: a processor and a memory. The memory is configured to store a computer execution instruction. When the network device runs, the processor executes the computer execution instruction stored in the memory, such that the executive function network element performs the information transmission method according to any one of the first aspect or the possible implementations of the first aspect.

A sixth aspect of the embodiments of this application provides a terminal, including: a processor and a memory. The memory is configured to store a computer execution instruction. When the terminal runs, the processor executes the computer execution instruction stored in the memory, such that the executive function network element performs the information transmission method according to any one of the second aspect or the possible implementations of the second aspect.

A seventh aspect of the embodiments of this application provides a computer-readable storage medium. The computer-readable storage medium stores an instruction. When the instruction is run on a computer, the computer is enabled to perform the information transmission method according to any one of the first aspect or the possible implementations of the first aspect.

An eighth aspect of the embodiments of this application provides a computer-readable storage medium. The computer-readable storage medium stores an instruction. When the instruction is run on a computer, the computer is enabled to perform the information transmission method according to any one of the second aspect or the possible implementations of the second aspect.

A ninth aspect of the embodiments of this application provides a computer program product including an instruction. When the computer program product runs on a computer, the computer is enabled to perform the information transmission method according to any one of the first aspect or the possible implementations of the first aspect.

A tenth aspect of the embodiments of this application provides a computer program product including an instruction. When the computer program product runs on a computer, the computer is enabled to perform the information transmission method according to any one of the second aspect or the possible implementations of the second aspect.

For technical effects brought by any implementation in the third aspect, fifth aspect, seventh aspect, and ninth aspect, refer to the technical effects brought by different implementations in the first aspect. Details are not described herein again.

For technical effects brought by any implementation in the fourth aspect, sixth aspect, eighth aspect, and tenth aspect, refer to the technical effects brought by different implementations in the second aspect. Details are not described herein again.

An eleventh aspect of the embodiments of this application provides a chip system. The chip system includes a processor, configured to support a network device in implementing a function in any one of the first aspect or the possible implementations of the first aspect. In a possible design, the chip system further includes a memory. The memory is configured to store a program instruction and data that are necessary for an executive function network element. The chip system may include a chip, or may include a chip and another discrete device.

A twelfth aspect of the embodiments of this application provides a chip system. The chip system includes a processor, configured to support a terminal in implementing a function in any one of the second aspect or the possible implementations of the second aspect. In a possible design, the chip system further includes a memory. The memory is configured to store a program instruction and data that are necessary for a control function network element. The chip system may include a chip, or may include a chip and another discrete device.

BRIEF DESCRIPTION OF DRAWINGS

To describe technical solutions in embodiments of this application more clearly, the following briefly describes the accompanying drawings for describing the embodiments. It is clear that the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1:
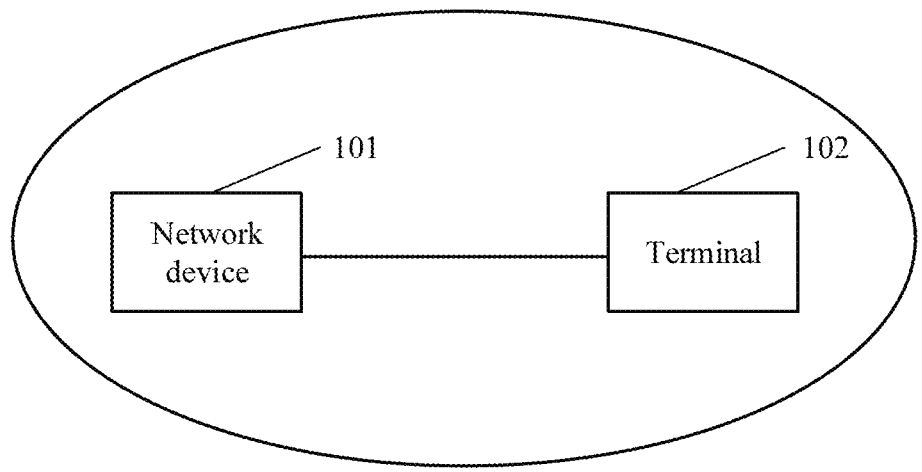
FIG. 1 is a schematic diagram of a communications system according to an embodiment of this application.

The following describes embodiments of this application with reference to the accompanying drawings. It is clear that the described embodiments are merely some example embodiments rather than all of the embodiments of this application. A person of ordinary skill in the art may learn that as a technology evolves and a new scenario emerges, the technical solutions provided in the embodiments of this application are also applicable to a similar technical problem.

The term "and/or" in this application may be an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances, such that embodiments described herein can be implemented in other orders than an order illustrated or described herein. Moreover, terms "include", "have" and any other variant thereof are intended to cover non-exclusive inclusion. For example, a process, a method, a system, a product, or a device that includes a series of steps or modules is not necessarily limited to expressly listing those steps or modules, but may include other steps or modules not expressly listed or inherent to the process, the method, the product, or the device. Naming or numbering of steps in this application does not mean that the steps in the method procedures need to be performed in a time/logical order indicated by the naming or numbering. An execution order of the steps in the procedures that have been named or numbered can be changed based on a technical objective to be achieved, as long as same or similar technical effects can be achieved. The module division in this application is logical division and may be another division during actual implementation. For example, a plurality of modules may be combined or integrated into another system, or some features may be ignored or not performed. In addition, the displayed or discussed mutual couplings or direct couplings or communications connections may be implemented using some interfaces. The indirect couplings or communications connections between the modules may be implemented in electronic or other forms. This is not limited in this application. In addition, modules or submodules described as separate components may be or may not be physically separated, or may be or may not be physical modules, or may be distributed on a plurality of circuit modules. Objectives of the solutions of this application may be achieved by selecting some or all of the modules based on actual demands.

Embodiments of this application provide an information transmission method and an apparatus, to dynamically indicate a time domain structure configuration of a time unit in a transmission direction, such that a terminal learns of the time domain structure configuration in advance and does not need to continuously monitor control information, thereby saving energy. In addition to dynamically indicating the time domain structure configuration (namely, the format configuration of the time unit) in the transmission direction, the terminal may further determine, based on the format configuration indicated by a network device and information about surroundings of the terminal (for example, information about receiving and sending of data by another surrounding terminal), available time units and unavailable time units in the format configuration indicated by the network device, then generate feedback information, and feed back the available time units to the network device, such that the network device may perform scheduling for data transmission based on the feedback information of the terminal, thereby reducing incorrect scheduling and improving data transmission efficiency. The following briefly describes some terms in the embodiments of the present disclosure first.

LBT is a mechanism for avoiding a conflict between nodes when the nodes use unlicensed spectrum resources. For example, because a communications system deployed in an unlicensed spectrum usually uses/shares a radio resource through contention, before sending a signal, each node managed by the communications system first monitors whether the unlicensed spectrum is idle. For example, a busy/idle state of the unlicensed spectrum is determined based on a value of receive power in the unlicensed spectrum. If the receive power is less than a specific threshold, it is considered that there is no interference source in the unlicensed spectrum and the unlicensed spectrum is in the idle state, and a signal may be sent in the unlicensed spectrum. If the receive power is greater than or equal to the threshold, no signal is sent.

A maximum channel occupancy time (MCOT) indicates a maximum value of a channel occupancy time (COT) of one transmission process. A value of the MCOT is limited by a service type of transmitted data and regulations for usage of an occupied unlicensed spectrum.

A time unit may also be referred to as a time domain unit, and refers to a predefined time domain structure. A time domain structure obtained through division in time domain is not limited in the present disclosure. The time unit generally includes a subframe, a mini-subframe, a slot, a mini-slot, an orthogonal frequency-division multiplexing (OFDM) symbol, or another similar name, and may be used to indicate a time domain resource. Based on different subcarrier spacings (SCS), the time unit may correspond to different time lengths. For example, when the SCS is 15 kilohertz (kHz), a subframe is used as an example, and a length of one subframe may be 1 millisecond (ms). A slot is used as an example, and one slot may include seven OFDM symbols or 14 OFDM symbols. A mini-slot is used as an example, and a quantity of OFDM symbols included in one mini-slot is less than a quantity of OFDM symbols included in one slot. The mini-slot may include two, four, or seven OFDM symbols, or another integral quantity of corresponding OFDM symbols.

The technical solutions of the embodiments of this application may be applied to various communications systems, such as a wireless local area network (WLAN) communications system, a Global System for Mobile Communications (GSM) system, a code-division multiple access (CDMA) system, a wideband code-division multiple access (WCDMA) system, a general packet radio service (GPRS) system, a Long-Term Evolution (LTE) system, an LTE frequency division duplex (FDD) system, an LTE time-division duplex (TDD) system, a universal mobile telecommunications system (UMTS), a worldwide interoperability for microwave access (WiMAX) communications system, and a future 5th generation (5G) system or a new radio (NR) system.

Optionally, a wireless communications system may be an LTE communications system that can work in an unlicensed frequency band, for example, an LTE-unlicensed (LTE-U) system, may be a new radio communications system that can work in an unlicensed frequency band, for example, an NR-unlicensed (NR-U) system, or may be another communications system that works in an unlicensed frequency band in the future. In addition, the wireless communications system may further include a Wi-Fi network.

Optionally, the network device may be a network device in a cell, or the network device may serve a terminal device in a cell. It should be noted that the cell may be understood as a serving cell of the network device, that is, an area in coverage of a wireless network of the network device.

It should be understood that the network device in the wireless communications system may be any device that has a wireless transceiver function. The network device includes but is not limited to an evolved NodeB (eNB), a radio network controller (RNC), a NodeB (NB), a base station controller (BSC), a base transceiver station (BTS), a home base station (for example, a home evolved NodeB or a home Node B (HNB)), a baseband unit (BBU), an access point (AP) in a Wi-Fi system, a wireless relay node, a wireless backhaul node, a transmission point (TP), a transmission reception point (TRP), or the like; or may be a gNB or transmission point (TRP or TP) in a 5G system such as an NR system, or one antenna panel or one group of antenna panels (including a plurality of antenna panels) of a base station in a 5G system; or may be a network node that constitutes a gNB or a transmission point, for example, a baseband unit (BBU) or a distributed unit (DU).

The terminal in the present disclosure is also referred to as a terminal device, and may be a device that provides a user with voice and/or data connectivity, a handheld device having a wireless connection function, or another processing device connected to a wireless modem. The terminal device may communicate with one or more core networks via a radio access network (RAN). The terminal device may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the terminal device is a device such as a personal communications service (PCS) phone, a cordless phone, a session initiation protocol (SIP) phone, a wireless local loop (WLL) station, or a personal digital assistant (PDA). A wireless terminal may also be referred to as a system, a subscriber unit, a subscriber station, a mobile station, a mobile, a remote station, an access point, a remote terminal, an access terminal, a user terminal, a user agent, a user device, or a user equipment (UE).

FIG. 1 is a schematic diagram of a communications system according to an embodiment of this application.

As shown in FIG. 1, the system framework includes a network device 101 and a terminal 102.

The network device 101 is configured to send first indication information to the terminal 102. The first indication information is used to indicate a format configuration of one or more time units in first time duration, the format configuration is a time domain structure configuration of the one or more time units in a transmission direction, the first time duration is less than or equal to second time duration, and the second time duration is a channel occupancy time of the network device 101. The channel occupancy time may be a maximum channel occupancy time, or a channel occupancy time less than a maximum channel occupancy time. This is not limited in this application.

The time unit is also referred to as a time domain unit. In addition, based on different granularities, the time unit may be divided into a subframe, a mini-subframe, a slot, a mini-slot, and an OFDM symbol. For detailed descriptions, refer to the foregoing detailed descriptions of the time unit. Details are not described herein again. The maximum channel occupancy time may be the foregoing MCOT, and details are not described herein again.

Optionally, the terminal 102 is configured to: after receiving the first indication information sent by the network device 101, send feedback information to the network device 101. The feedback information is used to indicate one or more time units determined by the terminal 102, and the one or more time units determined by the terminal are determined by the terminal 102 based on the format configuration of the one or more time units in the first time duration indicated by the first indication information. In an embodiment, the determined time units may be a determined time segment (or time period/interval). Therefore, the determined one or more time units may be one or more determined time segments.

That the at least one time unit determined by the terminal is determined based on the format configuration indicated by the first indication information may be understood as that the feedback information indicates at least one available or allowed time unit of the terminal. The at least one time unit is determined based on the format configuration indicated by the first indication information, the at least one time unit corresponds to the format configuration indicated by the first indication information, the at least one time unit meets the format configuration indicated by the first indication information, or a format configuration of the at least one time unit is a subset of the format configuration indicated by the first indication information.

Optionally, in an implementation, the network device 101 is further configured to receive the feedback information sent by the terminal 102. The feedback information is used to indicate the at least one time unit determined by the terminal 102. The at least one time unit is determined based on the format configuration indicated by the first indication information.

It should be noted that the feedback information in this application may alternatively be not generated based on the format configuration indicated by the first indication information, and the terminal 102 may report a feedback to the network device 101 based on another format configuration. This is not limited in this application.

Optionally, in an implementation, the transmission direction includes at least one of an uplink transmission direction, a downlink transmission direction, and an unknown transmission direction; the format configuration of the one or more time units in the first time duration includes: a quantity of all time units that are in the first time duration and arranged in chronological order and a transmission direction of each time unit; and the time unit includes a combination of one or more of a subframe, a mini-subframe, a slot, a mini-slot, and an orthogonal frequency division multiplexing symbol. An identifier of the format configuration of the one or more time units in the first time duration is shown in Table 1.

TABLE 1

| Format configuration type | Identifier of the format configuration |
| --- | --- |
| Format configuration 1: Y1 downlink mini-slots, Q1 OFDM symbols in an unknown direction, and Y2 uplink mini-slots | Entry index = 0 |
| Format configuration 2: Y1 downlink mini-slots, Z1 downlink OFDM symbols, Q1 OFDM symbols in an unknown direction, Z2 uplink OFDM symbols, and Y2 uplink mini-slots | Entry index = 1 |
| Format configuration 3: X1 downlink slots, 1 downlink mini-slot, Q1 OFDM symbols in an unknown direction, Y2 uplink mini-slots, and X2 uplink slots | Entry index = 2 |
| Format configuration 4: X1 downlink slots, Y1 downlink mini-slots, Z1 downlink OFDM symbols, F OFDM symbols, Z2 uplink OFDM symbols, Y2 uplink mini-slots, and X2 uplink slots | Entry index = 3 |
| Format configuration 5: Y1 downlink mini-slots, Q1 OFDM symbols in an unknown direction, Y2 uplink mini-slots, Y3 downlink mini-slots, Q2 OFDM symbols in an unknown direction, and Y4 uplink mini-slots | Entry index = 4 |
| Format configuration 6: Y1 downlink mini-slots, Z1 downlink OFDM symbols, Q1 OFDM symbols in an unknown direction, Z2 uplink OFDM symbols, Y2 uplink mini-slots, Y3 downlink mini-slots, Z3 downlink OFDM symbols, Q2 OFDM symbols in an unknown direction, Z4 uplink OFDM symbols, and Y4 uplink mini-slots | Entry index = 5 |
| Format configuration 7: X1 downlink slots, Y1 downlink mini-slots, Q1 OFDM symbols in an unknown direction, Y2 uplink mini-slots, X2 uplink slots, X3 downlink slots, Y3 downlink mini-slots, Q2 OFDM symbols in an unknown direction, Y4 uplink mini-slots, and X4 uplink slots | Entry index = 6 |
| Format configuration 8: X1 downlink slots, Y1 downlink mini-slots, Z1 downlink OFDM symbols, Q1 OFDM symbols in an unknown direction, Z2 uplink OFDM symbols, Y2 uplink mini-slots, X2 uplink slots, X3 downlink slots, Y3 downlink mini-slots, Z3 downlink OFDM symbols, Q2 OFDM symbols in an unknown direction, Z4 uplink OFDM symbols, Y4 uplink mini-slots, and X4 uplink slots | Entry index = 7 |
| ... | ... |

In Table 1, the format configuration type may be represented as Format X_n, and each type of Format X_n has a corresponding identifier such as an entry index, and a value corresponding to the entry index, for example, 0 to n−1. Q1, Q2, X1, X2, X3, X4, Y1, Y2, Y3, Y4, Z1, Z2, Z3 and Z4 in Table 1 may all be integers greater than or equal to 0. Any format configuration in the foregoing Format X_n may include zero, one, or more switching points switching point from downlink to uplink, and Table 1 shows some format configuration types including only one and two switching points. Therefore, the format configuration type in this application includes but is not limited to the eight format configuration types in Table 1. The network device may set a maximum quantity of switching points from downlink to uplink. It may be understood that, that the Format X_n includes zero switching points means that the format configuration of the one or more time units includes only a time domain structure configuration in any one of an uplink transmission direction, a downlink transmission direction, and an unknown transmission direction. Similarly, that the Format X_n includes one switching point means that such a structure of the Y1 downlink mini-slots, Q1 OFDM symbols in the unknown direction, and Y2 uplink mini-slots in the format configuration of the one or more time units of the index 0 in Table 1 appears at most twice.

The foregoing OFDM symbol in the unknown transmission direction may be represented using a specific symbol. For example, the OFDM symbol in the unknown transmission direction may be identified using a symbol U or a symbol F. In this case, Q consecutive OFDM symbols in the unknown direction may be represented as Q consecutive symbols U or Q consecutive symbols F, where Q is an integer greater than or equal to 1. A specific value of Q may be a value of Q1, Q2, or Q3.

It should be further noted that, as shown in Table 1, different format configurations are identified using different values of the entry indexes. The foregoing values of the entry indexes are a series of values that are preset according to a specific rule, and one entry index corresponds to one value. The values of the entry indexes may be a series of values starting from 0 and increasing in ascending order. For example, the value of the first entry index is 0, the value of the second entry index is 1, . . . , and the value of an $N^{th}$ entry index is N−1, where N is an integer greater than or equal to 1. In addition, the values of the entry indexes may be a series of values starting from another preset threshold (a non-zero threshold) and increasing in ascending order. This is not limited in this application. The foregoing OFDM symbol in the unknown direction may be represented as an F marker or a U marker, and the Q consecutive OFDM symbols in the unknown direction may be represented as Q consecutive F markers or Q consecutive U markers. For example, the Format X_n may be a slot, a combination of a plurality of slots, a mini-slot, a combination of a plurality of mini-slots, an OFDM symbol, a combination of a plurality of OFDM symbols, or a combination of any two or more of one slot/a plurality of slots, one mini-slot/a plurality of mini-slots, and one OFDM symbol/a plurality of OFDM symbols. When the Format X_n includes a combination of a plurality of slots, each slot may have a corresponding entry to indicate a specific format configuration of the slot, and the combination of the plurality of slots is a joint indicator indicated by the entries of the plurality of slots. When the Format X_n includes a combination of a plurality of mini-slots, each mini-slot may have a corresponding entry to indicate a specific format configuration of the mini-slot, and the combination of the plurality of mini-slots is a joint indicator indicated by the entries of the plurality of mini-slots. When the Format X_n includes a combination of a plurality of OFDM symbols, every several symbols may have a corresponding entry to indicate a specific format configuration of the symbols, and the combination of the plurality of OFDM symbols is a joint indicator indicated by the entries of the plurality of OFDM symbols. Correspondingly, when the Format X_n includes a combination of any two or more of one slot/a plurality of slots, one mini-slot/a plurality of mini-slots, and one OFDM symbol/a plurality of OFDM symbols, the combination may be a joint indicator of entries that are obtained through division based on the foregoing granularities. The granularity is one or more of a slot, a mini-slot, or several symbols. For the foregoing granularity, the network device may pre-configure corresponding format information, and the format information includes an indication of a second-level entry, namely, the second-level entry and matching information of a corresponding format. The pre-configuration may be preset or written in the network device and the corresponding terminal device. The joint indicator further has a corresponding entry shown in Table 1.

The mini-slot in this specification may include one OFDM symbol, two OFDM symbols, four OFDM symbols, seven OFDM symbols, or more OFDM symbols.

Alternatively, the entry index may not be explicitly configured, and is implicitly included in notification signaling of the Format X_n. For example, the format configuration 1, the format configuration 2, . . . are sequentially configured. Therefore, when receiving the format configuration 1, the format configuration 2, . . . , the UE may consider by default that the format configuration 1 corresponds to the entry index 1, and the format configuration 2 corresponds to the entry index 2, . . . .

Optionally, in an implementation, the first indication information may include the identifier of the format configuration of the one or more time units in the first time duration. The correspondence between the identifier of the format configuration of the one or more time units in the first time duration and the format configuration of the one or more time units in the first time duration may include but is not limited to the correspondence shown in Table 1.

Optionally, in an implementation, that the network device 101 sends the first indication information to the terminal 102 may be: The network device 101 sends the first indication information to the terminal 102 on a preset frequency resource. The network device 101 configures a control resource set (CORSET) for the terminal 102, where the control resource set is used to send the first indication information. The preset frequency resource may be a control resource set pre-configured by the network device 101 for the terminal. Correspondingly, the terminal 102 performs detection on the control resource set configured by the network device 101 for the terminal 102, to obtain the first indication information. The first indication information may alternatively be sent in corresponding search space, and the search space is also a common search space (group common search space or group common search space) that is pre-configured by the network device 101 for the terminal 102. As described above, all configurations or pre-configurations in this specification may be sent via at least one of radio resource control (RRC) signaling, medium access control (MAC) signaling, or physical layer (PHY) signaling.

Optionally, the feedback information may include the following several types,

1. The feedback information includes an indication bit (or indicator bit) and at least one time segment.

2. The feedback information includes indication information of the at least one time unit determined by the terminal 102 or indication information of time duration/a time segment determined by the terminal 102.

3. The feedback information includes a first bitmap.

4. The feedback information includes a second bitmap.

5. The feedback information includes a level indication.

The indication information of the at least one time unit determined by the terminal 102 may be an identifier of a format configuration of the at least one time unit determined by the terminal. An example identifier is shown in Table 1. The indication information of the time duration determined by the terminal 102 may be a start moment and duration of the time duration determined by the terminal. The indication information of the time segment determined by the terminal 102 may be a start moment and duration of the time segment determined by the terminal, indication information that is similar to discontinuous reception (DRX) and determined by the terminal, or an identifier of the time segment determined by the terminal. The information transmission method in the embodiments of this application is applicable to an unlicensed spectrum system. For example, the information transmission method is used in an unlicensed frequency domain of a 5G mobile communications system. In the 5G mobile communications system, the network device 101 in the system framework in FIG. 1 may be a 5G base station gNB, and the terminal 102 may be UE. As described above, in the foregoing implementation, there are a plurality of types of feedback information. The following describes in detail, with reference to embodiments and for different types of feedback information, the information transmission method provided in the embodiments of this application.

1. The feedback information includes an indication bit and at least one time segment.

Figure 2:
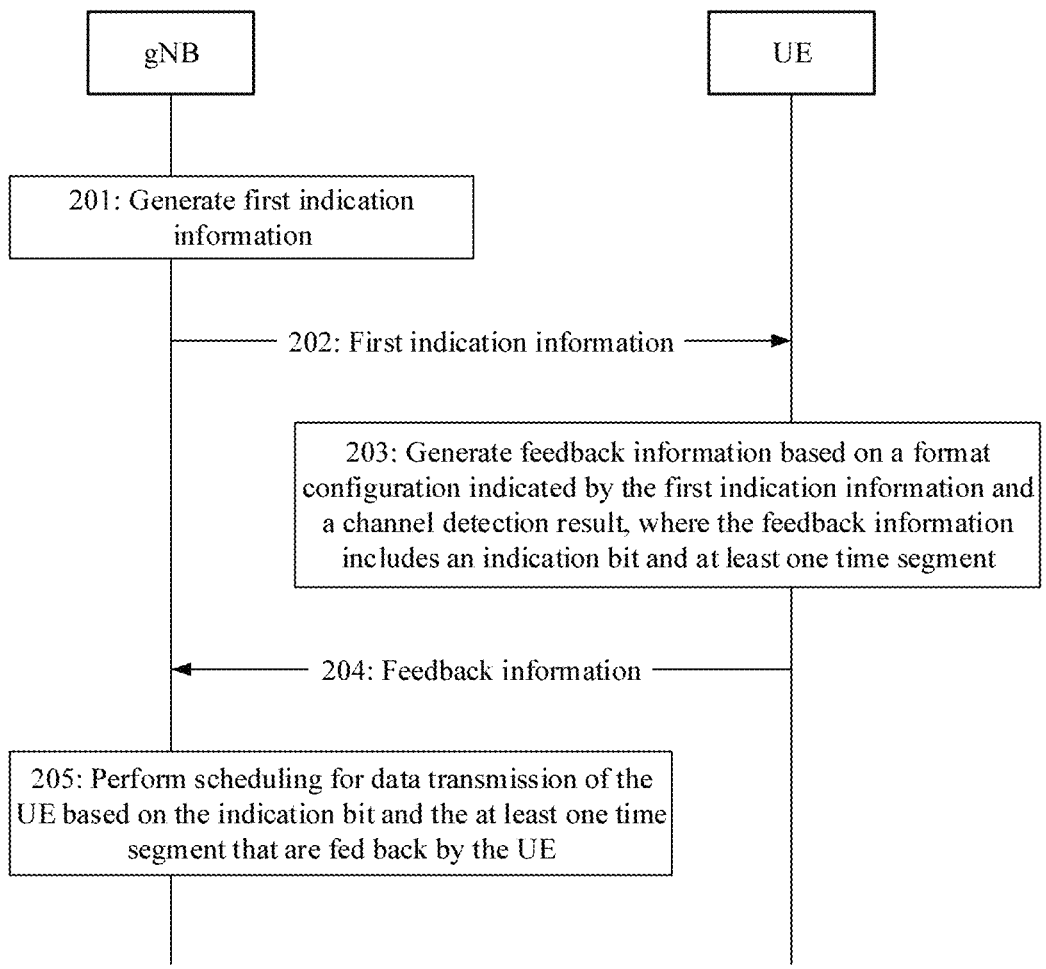
FIG. 2 is a schematic diagram of an embodiment of an information transmission method according to an embodiment of this application.

FIG. 2 is a schematic diagram of an embodiment of an information transmission method according to an embodiment of this application.

Optionally, in 201, a gNB generates first indication information.

The first indication information is used to indicate a format configuration of one or more time units in first time duration. The format configuration is a configuration of an uplink/downlink transmission direction, and the format configuration includes one or more of an uplink transmission direction, a downlink transmission direction, or an unknown transmission direction.

Optionally, in an implementation, the first indication information may be an identifier of the format configuration of the one or more time units in the first time duration. After receiving the identifier of the format configuration of the one or more time units in the first time duration, UE may determine the format configuration indicated by the first indication information, based on the identifier of the format configuration of the one or more time units in the first time duration and correspondence information sent by the gNB before sending the first indication information, where the correspondence information is delivered by the gNB via at least one of RRC signaling, MAC signaling, or physical layer signaling, and the correspondence information includes but is not limited to the correspondence in Table 1. Alternatively, the UE pre-stores the correspondence information shown in Table 1, and queries Table 1 for the identifier of the format configuration of the one or more time units in the first time duration after the UE receives the identifier that is delivered by the gNB, that is of the format configuration of the one or more time units in the first time duration, and that is carried in the first indication information, to obtain the format configuration indicated by the first indication information.

Optionally, the first indication information may be a joint indicator indicating one or more entry indicators of any one type of time unit in one or more subframes, mini-subframes, slots, mini-slots, or OFDM symbols. For example, when the Format X_n includes one or more subframes, each subframe corresponds to one entry indicator, to indicate a specific format configuration of the subframe, where the first indication information is joint indicator information including the one or more entry indicators of the one or more subframes; when the Format X_n includes one or more mini-subframes, each mini-subframe corresponds to one entry indicator, to indicate a specific format configuration of the mini-subframe, where the first indication information is joint indicator information including the one or more entry indicators of the one or more mini-subframes; when the Format X_n includes one or more slots, each slot corresponds to one entry indicator, to indicate a specific format configuration of the slot, where the first indication information is joint indicator information including the one or more entry indicators of the one or more slots; when the Format X_n includes one or more mini-slots, each mini-slot corresponds to one entry indicator, to indicate a specific format configuration of the mini-slot, where the first indication information is joint indicator information including the one or more entry indicators of the one or more mini-slots, and the mini-slot may include one OFDM symbol, two OFDM symbols, four OFDM symbols, or seven OFDM symbols; when the Format X_n includes one or more OFDM symbols, each OFDM symbol corresponds to one entry indicator, to indicate a specific format configuration of the OFDM symbol, where the first indication information is joint indicator information including the one or more entry indicators of the one or more OFDM symbols; or when the Format X_n includes a plurality of OFDM symbols, the plurality of OFDM symbols in the Format X_n correspond to one entry indicator, to indicate a specific format configuration of the plurality of OFDM symbols, where the first indication information may be joint indicator information including one or more entry indicators.

Optionally, the first indication information may be a joint indicator indicating a plurality of entry indicators corresponding to a slot combination slot combination of time units of at least two granularities in a subframe, a mini-subframe, a slot, a mini-slot, and an OFDM symbol. It may be understood that when the Format X_n includes the time units of the at least two granularities, an entry indicator corresponding to each of the granularities included in the Format X_n is obtained through division based on the granularity. For example, if the Format X_n includes a plurality of slots, a plurality of mini-slots, and a plurality of OFDM symbols, the first indication information includes a plurality of entry indicators that correspond to the plurality of slots, a plurality of entry indicators that correspond to the plurality of mini-slots, and a plurality of entry indicators that correspond to the plurality of OFDM symbols. It should be noted that, for other descriptions of the first indication information, refer to the related descriptions in Table 1. Details are not described herein again.

Optionally, the first indication information may be slot format indicator (SFI) information, or indication information of a format configuration of another time unit.

202: The gNB sends the first indication information to the UE in an unlicensed spectrum.

Optionally, in an embodiment, the gNB may configure the first indication information for the UE via at least one of RRC signaling, media access control (MAC) signaling, or physical layer signaling. Optionally, in an embodiment, the gNB may send the first indication information through a physical downlink control channel (PDCCH), and the first indication information sent through the PDCCH may be sent through a group common PDCCH. For example, the first indication information may be carried in a downlink control information (DCI) format that is a newly defined format in the PDCCH and that is specially used for a time unit configuration notification. For example, the newly defined format may be an SFI-DCI format.

The first indication information is a dynamic indication, and the dynamic indication may be obtained through periodical monitoring. In other words, in a duration in which the LBT succeeds and the gNB may use the channel, the gNB may determine a monitoring moment based on one or more of a monitoring periodicity, a monitoring offset, or a monitoring symbol, and the gNB may send a dynamic indication of the first indication information to the UE at the monitoring moment. The dynamic indication of the first indication information includes a time domain structure configuration information of the one or more time units in the first time duration. The first time duration is less than or equal to a channel occupancy time. The channel occupancy time may be a maximum channel occupancy time, or another channel occupancy time less than a maximum channel occupancy time. The first time duration may be a variable value. The first time duration may be greater than or equal to the monitoring periodicity. In this case, a dynamic indication obtained at a monitoring moment may indicate time domain structure configuration information of a time unit in a period of time that is longer than the monitoring periodicity. In addition, when a time length between the monitoring moment and the end moment of the maximum channel occupancy time is less than the monitoring periodicity, the first time duration indicated by the first indication information is less than the monitoring periodicity, such that a format configuration of a corresponding time length can be indicated when the end moment of the maximum channel occupancy time approaches. The corresponding time length is the time length from the monitoring moment to the end moment of the maximum channel occupancy time. It may be understood that, to enable the UE to determine the monitoring moment based on one or more of the monitoring periodicity, the monitoring offset, or the monitoring symbol, the gNB may configure one or more of the monitoring periodicity, the monitoring offset, or the monitoring symbol for the UE, and send the one or more of the monitoring periodicity, the monitoring offset, or the monitoring symbol to the UE.

It may be learned from the foregoing technical solution in which the first indication information is sent in a form of a dynamic indication that when the first indication information cannot be sent because the monitoring moment just falls within a time unit that is in an uplink transmission direction and indicated by the dynamically indicated DCI, because the first time duration may be greater than or equal to the monitoring periodicity, a configuration of a corresponding time unit can still be obtained based on the first indication information sent at a previous monitoring moment.

Optionally, in an implementation, the first indication information is obtained based on a preset identifier. The preset identifier may be a downlink DL group-specific radio network temporary identifier (RNTI) or a group common RNTI.

Optionally, in an implementation, the first indication information may alternatively be included in a random access response message 2 or may be included in a channel utilization indication/indicator PDCCH (PDCCH, CUI-PDCCH), and sent to the UE.

Optionally, if the gNB divides the maximum channel occupancy time into a preparation phase and a data transmission phase, the gNB sends the first indication information to the UE in the data preparation phase.

Optionally, in an implementation, the gNB may send the first indication information to the UE on a preset frequency resource in the CORSET configured for the UE. Alternatively, the first information may be sent to the UE in a group common search space group common search space of the UE.

Optionally, in 203, the UE generates feedback information based on the format configuration indicated by the first indication information and a channel detection result.

After detecting interference from a surrounding network device and surrounding UE, the UE determines, based on an interference detection result, a time unit that is in the one or more time units indicated by the first indication information and in which no interference is suffered or interference less than a preset threshold is suffered as an available time unit, and generates the feedback information based on the available time unit. The feedback information is used to indicate at least one of the available time unit and an unavailable time unit.

For example, after the UE determines the format configuration delivered by the gNB via the first indication information, the UE determines, based on a result obtained through the channel detection, a time unit/time segment occupied by the surrounding UE and network device. Then, the UE determines an overlapping part between the time unit/time segment occupied by the surrounding UE or network device and a time unit/time segment indicated by the first indication information as an unavailable time unit/time segment, and determines a remaining non-overlapping part as an available time unit/time segment.

The UE determines the format configuration of the one or more time units in the first time duration based on the identifier of the format configuration of the one or more time units in the first time duration. A determining method may be but is not limited to the following two implementations.

(1) The format configuration of the one or more time units in the first time duration is determined by the UE based on a correspondence table (for example, Table 1) delivered by the gNB to the terminal. Table 1 shows the correspondence between the identifier and the format configuration of the one or more time units in the first time duration. The correspondence table is sent to the UE before the gNB delivers the format configuration of the one or more time units in the first time duration.

(2) The UE prestores the correspondence table. After receiving the identifier that is of the format configuration of the one or more time units in the first time duration and that is delivered by the gNB, based on the correspondence table, the UE queries the correspondence table using the received identifier of the format configuration, to obtain the format configuration of the one or more time units in the first time duration.

Optionally, in 204, the UE sends the feedback information in the unlicensed spectrum. The feedback information includes an indication bit and at least one time segment.

The indication bit is used to indicate whether the first time segment in the at least one time segment in the feedback information is available or unavailable. When the at least one time segment is two or more time segments, N time segments are used as an example, and N is a positive integer greater than 2. If the indication bit indicates that the first time segment is available, in the at least one time segment, the first time segment is available, the second time segment is unavailable, . . . , an $(N-1)^{th}$ time segment is available, and an $N^{th}$ time segment is unavailable, where N is an even number; if the indication bit indicates that the first time segment is available, in the at least one time segment, the first time segment is available, the second time segment is unavailable, . . . , an $(N-1)^{th}$ time segment is unavailable, and an $N^{th}$ time segment is available, where N is an odd number; if the indication bit indicates that the first time segment is unavailable, in the at least one time segment, the first time segment is unavailable, the second time segment is available, . . . , an $(N-1)^{th}$ time segment is unavailable, and an $N^{th}$ time segment is available, where N is an even number; or if the indication bit indicates that the first time segment is available, in the at least one time segment, the first time segment is available, the second time segment is unavailable, . . . , an $(N-1)^{th}$ time segment is available, and an $N^{th}$ time segment is unavailable, where N is an odd number.

Optionally, the indication bit included in the feedback information may be omitted. To be more specific, the feedback information may not include the indication bit, and include only the at least one time segment. For example, if it is predefined or specified by default that the feedback information is always fed back starting from an available time segment, the indication bit may be omitted.

It should be noted that the feedback information in this embodiment of this application may not depend on the format configuration indicated by the indication information in this embodiment of this application.

Optionally, in an implementation, the feedback information may be carried in a newly defined uplink control information (UCI) format for sending. The feedback information in the UCI format is a reporting format specially used by the UE to feed back the available time unit to the gNB. The format may be referred to as SFI-UCI. It may be understood that the feedback information in the SFI-UCI format may be specially used to feed back the first indication information delivered by the gNB in the SFI-DCI format.

Optionally, in an implementation, the UE sends the feedback information on the preset frequency domain resource in the unlicensed spectrum. The feedback information is obtained after scrambling is performed using a preset identifier, and the preset identifier may be an uplink (UL) group common RNTI. The UL group common RNTI is configured by the gNB via higher layer signaling. The preset frequency domain resource is also a frequency resource that is configured by the gNB via higher layer signaling and that is used by the UE to send the feedback information. The resource may be specific search space configured by a network device.

Optionally, in 205, the gNB performs scheduling for data transmission of the UE based on the indication bit and the at least one time segment that are fed back by the UE.

That the gNB performs scheduling for data transmission of the UE based on the indication bit and the at least one time segment that are fed back by the UE may be that the gNB performs scheduling based on the available time segment fed back by the UE using the indication bit and the at least one time segment, or may be that the gNB may simultaneously schedule the available time segment and the unavailable time segment that are fed back using the indication bit and the at least one time segment. For example, the gNB performs data scheduling in a modulation and coding scheme (MCS)-unrestricted scheduling manner and in the available time segment obtained based on the indication bit and the at least one time segment. The MCS-unrestricted scheduling manner is a scheduling manner of a preset MCS used for allowed scheduling. Optionally, in addition, the gNB performs data scheduling in an MCS-restricted scheduling manner and in the unavailable time segment indicated by the indication bit and the at least one time segment. The MCS-restricted scheduling manner is a scheduling manner of an MCS that is lower than the preset MCS used for allowed scheduling. For example, in the MCS-restricted scheduling manner, the MCS may be a relatively lower modulation and coding scheme such as quadrature phase shift keying (QPSK), quadrature amplitude modulation (QAM), or 16QAM.

It may be understood that, when the available time segment fed back by the UE is greater than or equal to a time domain resource required by to-be-scheduled data, the gNB schedules data only in the available time segment fed back by the UE, and does not schedule data in the unavailable time segment fed back by the UE. Similarly, when the available time segment fed back by the UE is less than the time domain resource required by the to-be-scheduled data, the scheduling manner may be changed to schedule data, such that the time domain resource is sufficient; or data may be scheduled in some or all unavailable time units fed back by the UE.

2. The feedback information includes indication information of the one or more time units determined by the UE or indication information of time duration determined by the UE.

Figure 3:
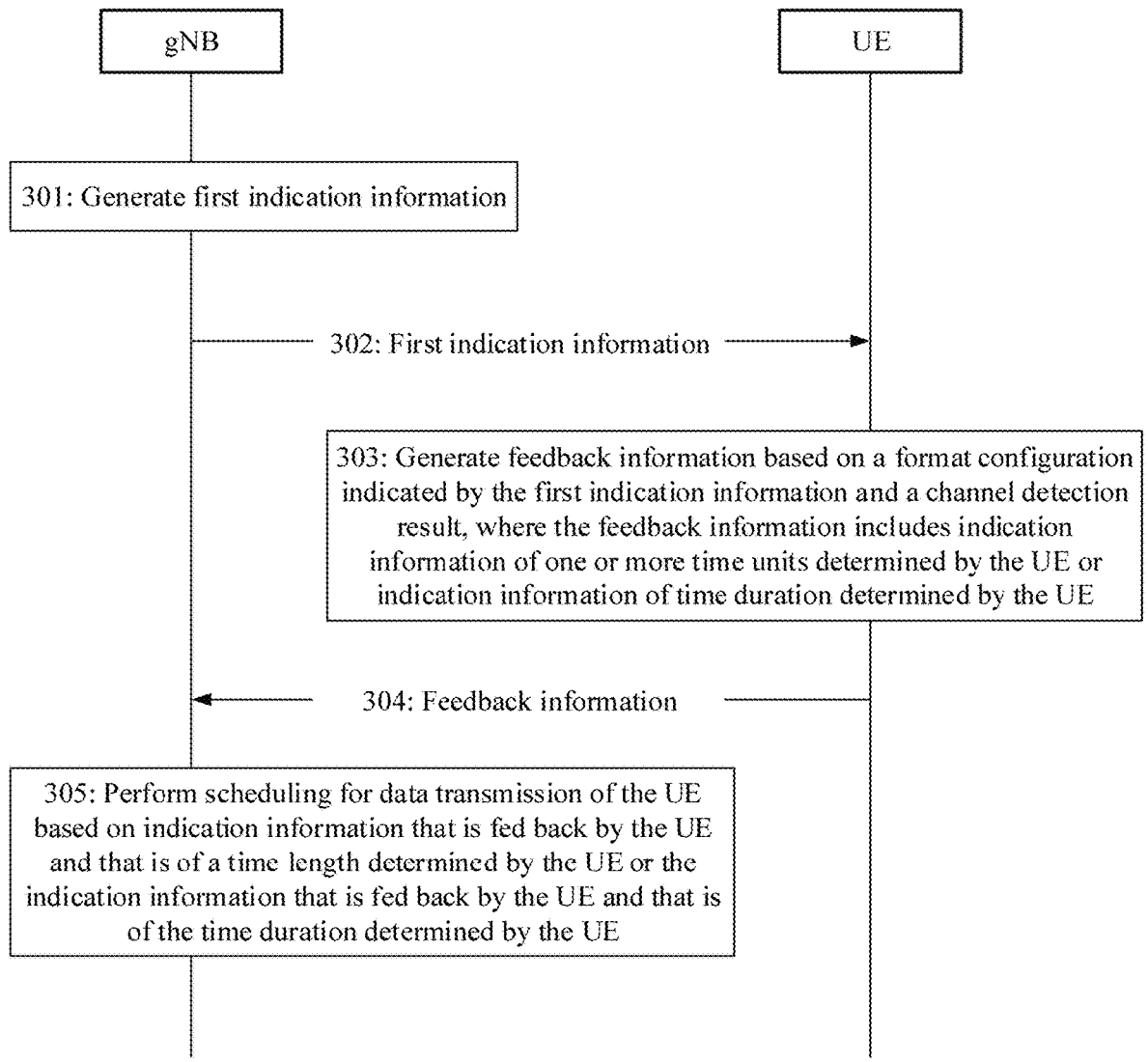
FIG. 3 is a schematic diagram of another embodiment of an information transmission method according to an embodiment of this application.

FIG. 3 is a schematic diagram of another embodiment of an information transmission method according to an embodiment of this application.

Optionally, in 301, a gNB generates first indication information.

302: The gNB sends the first indication information to UE in an unlicensed spectrum.

Optionally, in 303, the UE generates feedback information based on a format configuration indicated by the first indication information and a channel detection result.

Step 301 to step 303 are respectively similar to step 201 to step 203, and details are not described herein again.

Optionally, in 304, the UE sends the feedback information in the unlicensed spectrum. The feedback information includes indication information of one or more time units determined by the UE or indication information of time duration determined by the UE.

Different from the feedback manner or the indication manner of the feedback information in the foregoing embodiment, in this embodiment, the feedback information fed back by the UE indicates an available time unit/time segment of the UE via the indication information of the one or more time units determined by the UE or the indication information of the time duration determined by the UE. Optionally, in an embodiment, the indication information of the one or more time units determined by the UE may be an identifier of an available time unit determined by the UE or an identifier of an unavailable time unit determined by the UE. A format configuration corresponding to the identifier of the available time unit determined by the UE or the identifier of the unavailable time unit determined by the UE may be the same as some or all configurations in the format configuration indicated by the first indication information. It may be understood that the UE determines that the identifier of the available time unit may feed back a time unit whose granularity is smaller than a granularity indicated by the first indication information. For example, a slot indicated by the first indication information includes seven OFDM symbols, where the UE detects that four OFDM symbols in the slot are available and the other three OFDM symbols are unavailable.

Optionally, the indication information of the time duration determined by the UE may be a start moment and duration corresponding to the time duration, or another indication manner indicating a time segment. This is not limited in this application.

Optionally, in an implementation, the feedback information may be carried in a newly defined UCI format for sending. The feedback information in the UCI format is a reporting format specially used by the UE to feed back the available time unit to the gNB. The format may be referred to as SFI-UCI. It may be understood that the feedback information in the SFI-UCI format may be specially used to feed back the first indication information delivered by the gNB in the SFI-DCI format.

Optionally, in an implementation, the UE sends the feedback information on a preset frequency domain resource in the unlicensed spectrum. The feedback information is obtained after scrambling is performed using a preset identifier, and the preset identifier may be a UL group common RNTI. The UL group common RNTI is configured by the gNB via higher layer signaling. The preset frequency domain resource is also a frequency resource that is configured by the gNB via higher layer signaling and that is used by the UE to send the feedback information. The resource may be specific search space configured by a network device.

Optionally, in 305, the gNB performs scheduling for data transmission of the UE based on the indication information that is fed back by the UE and that is of the one or more time units determined by the UE or the indication information that is fed back by the UE and that is of the time duration determined by the UE.

This step 305 is similar to step 205. For descriptions of step 305, refer to the related descriptions in step 205, and details are not described herein again.

3. The feedback information includes a first bitmap.

Figure 4:
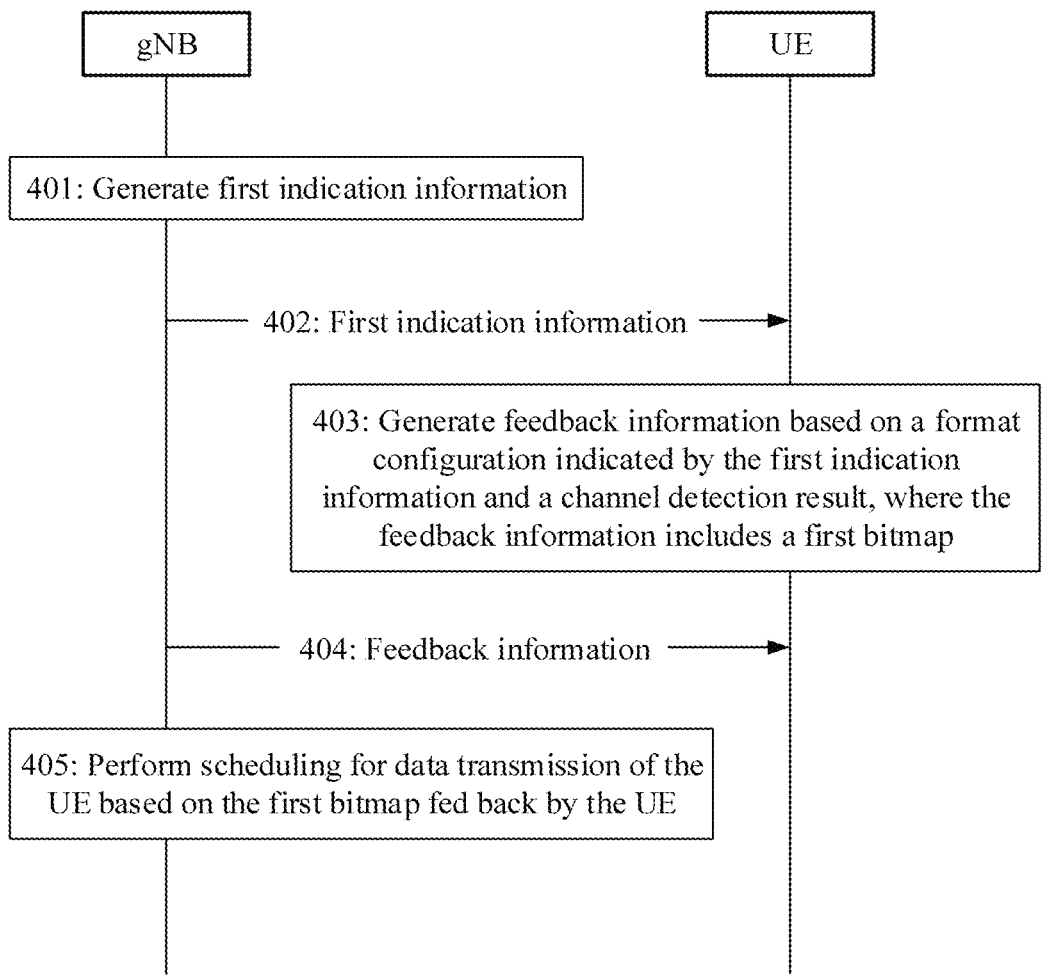
FIG. 4 is a schematic diagram of another embodiment of an information transmission method according to an embodiment of this application.

FIG. 4 is a schematic diagram of another embodiment of an information transmission method according to an embodiment of this application.

Optionally, in 401, a gNB generates first indication information.

402: The gNB sends the first indication information to UE in an unlicensed spectrum.

Optionally, in 403, the UE generates feedback information based on a format configuration indicated by the first indication information and a channel detection result.

Step 401 to step 403 are respectively similar to step 201 to step 203, and details are not described herein again.

Optionally, in 404, the UE sends the feedback information in the unlicensed spectrum. The feedback information includes a first bitmap.

Time duration corresponding to the first bitmap is equal to a time length of the foregoing first time duration, and the first bitmap is used to indicate whether each time unit in the first time duration is available or unavailable. When each time unit in the corresponding first time duration is a bit 1, the time unit is available; and when each time unit in the first time duration is a bit 0, the time unit is unavailable.

Optionally, in an implementation, the feedback information may be carried in a newly defined UCI format for sending. The feedback information in the UCI format is a reporting format specially used by the UE to feed back the available time unit to the gNB. The format may be referred to as SFI-UCI. It may be understood that the feedback information in the SFI-UCI format may be specially used to feed back the first indication information delivered by the gNB in the SFI-DCI format.

Optionally, in an implementation, the UE sends the feedback information on a preset frequency domain resource in the unlicensed spectrum. The feedback information is obtained after scrambling is performed using a preset identifier, and the preset identifier may be a UL group common RNTI. The UL group common RNTI is configured by the gNB via higher layer signaling. The preset frequency domain resource is also a frequency resource that is configured by the gNB via higher layer signaling and that is used by the UE to send the feedback information. The resource may be specific search space configured by a network device. The resource may be specific search space configured by a network device. Optionally, when the feedback information includes the first bitmap, the feedback information may additionally include the first indication information delivered by the gNB, to ensure that a surrounding node that cannot detect the first indication information can correspondingly learn of an available time segment of the UE based on the feedback information. Therefore, the node is prevented from interfering with receiving of scheduled data information by other UEs in the time segment.

Optionally, in 405, the gNB performs scheduling for data transmission of the UE based on the first bitmap fed back by the UE.

This step 405 is similar to step 205. For descriptions of step 405, refer to the related descriptions in step 205, and details are not described herein again.

4. The feedback information includes a second bitmap.

Figure 5:
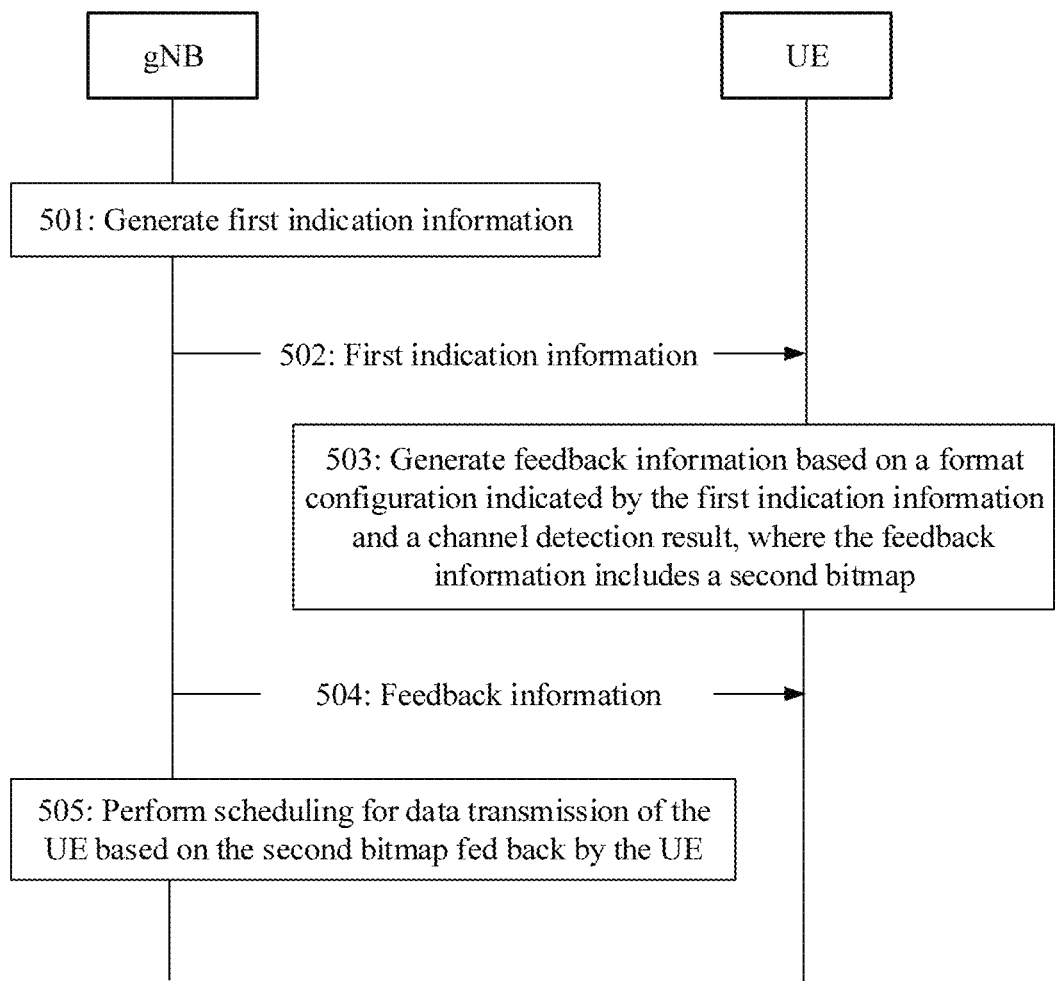
FIG. 5 is a schematic diagram of another embodiment of an information transmission method according to an embodiment of this application.

FIG. 5 is a schematic diagram of another embodiment of an information transmission method according to an embodiment of this application.

Optionally, in 501, a gNB generates first indication information.

502: The gNB sends the first indication information to UE in an unlicensed spectrum.

Optionally, in 503, the UE generates feedback information based on a format configuration indicated by the first indication information and a channel detection result.

Step 501 to step 503 are respectively similar to step 201 to step 203, and details are not described herein again.

Optionally, in 504, the UE sends the feedback information in the unlicensed spectrum. The feedback information includes a second bitmap.

Time duration corresponding to the second bitmap is less than a time length of the foregoing first time duration, and the second bitmap is used to indicate only an available time unit in the first time duration rather than an unavailable time unit in the first time duration.

Alternatively, time duration corresponding to the second bitmap is less than a time length of the foregoing first time duration, and the second bitmap is used to indicate only an unavailable time unit in the first time duration rather than an available time unit in the first time duration.

Alternatively, the second bitmap includes two bitmaps. One bitmap corresponds to an available time unit in the first time duration, and the other bitmap corresponds to an unavailable time unit in the first time duration.

Alternatively, a start moment of indication information corresponding to the second bitmap is an intermediate moment rather than a start moment of the first indication information. The intermediate moment is an available start moment, and the second bitmap indicates an available time unit that starts from the intermediate moment and that is in the first time duration.

Alternatively, a start moment of indication information corresponding to the second bitmap is an intermediate moment rather than a start moment of the first indication information. The intermediate moment is an unavailable start moment, and the second bitmap indicates an unavailable time unit that starts from the intermediate moment and that is in the first time duration.

In all the foregoing embodiments, a corresponding time unit may be indicated using a bit position of 1. In other words, that the time unit is available is indicated.

Optionally, when the feedback information includes the second bitmap, the feedback information may additionally include the first indication information delivered by a network device, to ensure that a surrounding node that cannot detect the first indication information can correspondingly learn of an available time segment of the UE based on the feedback information. Therefore, the node is prevented from interfering with receiving of scheduled data information by other UEs in the time segment.

Optionally, in an implementation, the feedback information may be carried in a newly defined UCI format for sending. The feedback information in the UCI format is a reporting format specially used by the UE to feed back the available time unit to the gNB. The format may be referred to as SFI-UCI. It may be understood that the feedback information in the SFI-UCI format may be specially used to feed back the first indication information delivered by the gNB in the SFI-DCI format.

Optionally, in an implementation, the UE sends the feedback information on a preset frequency domain resource in the unlicensed spectrum. The feedback information is obtained after scrambling is performed using a preset identifier, and the preset identifier may be a UL group common RNTI. The UL group common RNTI is configured by the gNB via higher layer signaling. The preset frequency domain resource is also a frequency resource that is configured by the gNB via higher layer signaling and that is used by the UE to send the feedback information. The resource may be specific search space configured by a network device. The resource may be specific search space configured by a network device.

Optionally, in 505, the gNB performs scheduling for data transmission of the UE based on the second bitmap fed back by the UE.

This step 505 is similar to step 205. For descriptions of step 505, refer to the related descriptions in step 205, and details are not described herein again.

5. The feedback information includes a level indication.

Figure 6:
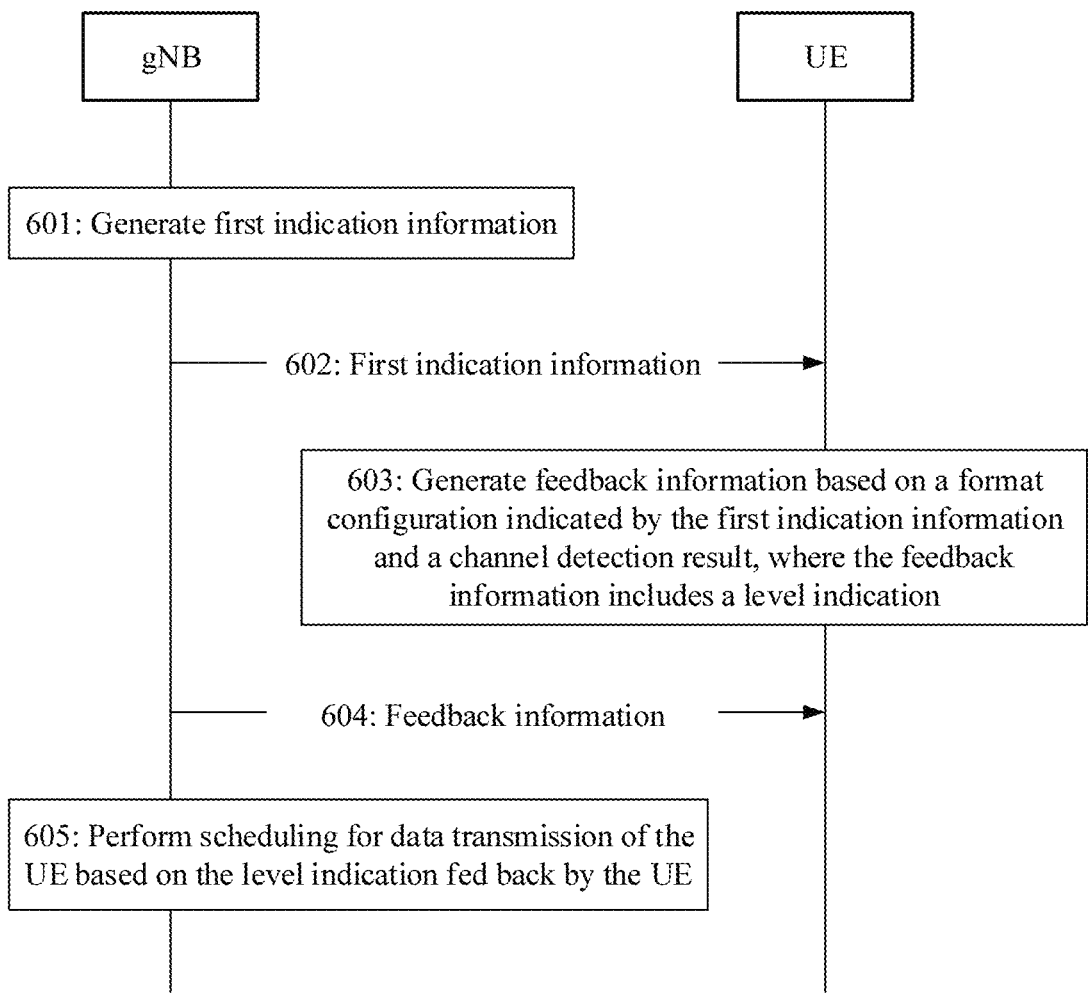
FIG. 6 is a schematic diagram of another embodiment of an information transmission method according to an embodiment of this application.

FIG. 6 is a schematic diagram of another embodiment of an information transmission method according to an embodiment of this application.

Optionally, in 601, a gNB generates first indication information.

602: The gNB sends the first indication information to UE in an unlicensed spectrum.

Optionally, in 603, the UE generates feedback information based on a format configuration indicated by the first indication information and a channel detection result.

Step 601 to step 603 are respectively similar to step 201 to step 203, and details are not described herein again.

Optionally, in 604, the UE sends the feedback information in the unlicensed spectrum. The feedback information includes a level indication.

The level indication is used to indicate a level of interference in each of the at least one time unit determined by the UE. The level of the interference is obtained by the UE based on the channel detection result. The interference may be from other UEs within a specific range near the UE, and the other terminals may be UEs to which another network device belongs. Alternatively, the interference may be from another network device (including the gNB) within a specific range near the terminal.

Optionally, the level indication may be used to indicate a first-level available/unavailable time unit and a second-level available/unavailable time unit. The first level and the second level may be indication information of different blocking levels that are based on detected interference severity. The first level indicates slight interference, and interference indicated by the second level is more than that indicated by the first level but is not severe, such that the gNB can perform corresponding scheduling based on such information.

Optionally, in an implementation, the feedback information may be carried in a newly defined UCI format for sending. The feedback information in the UCI format is a reporting format specially used by the UE to feed back the available time unit to the gNB. The format may be referred to as SFI-UCI. It may be understood that the feedback information in the SFI-UCI format may be specially used to feed back the first indication information delivered by the gNB in the SFI-DCI format.

Optionally, in an implementation, the UE sends the feedback information on a preset frequency domain resource in the unlicensed spectrum. The feedback information is obtained after scrambling is performed using a preset identifier, and the preset identifier may be a UL group common RNTI. The UL group common RNTI is configured by the gNB via higher layer signaling. The preset frequency domain resource is also a frequency resource that is configured by the gNB via higher layer signaling and that is used by the UE to send the feedback information. The resource may be specific search space configured by a network device. The resource may be specific search space configured by a network device.

Optionally, in 605, the gNB performs scheduling for data transmission of the UE based on the level indication fed back by the UE.

When load is relatively heavy, both a first-level available time domain resource and a resource that is not completely interference-free but is not severely interfered, for example, a second-level available time domain resource, may be selected for scheduling, and a restricted MCS is used during the scheduling; and when the load is light, only an available resource is selected for scheduling. In other words, the first-level available time domain resource is used for accurate scheduling.

Related descriptions of this step 605 are similar to the descriptions in step 205. For descriptions of step 605, refer to the related descriptions in step 205, and details are not described herein again.

All related content of the steps in the method embodiment corresponding to FIG. 1 may be cited, but is not limited to function descriptions of the gNB and the UE in FIG. 2 to FIG. 6. Details are not described herein again.

In the embodiments corresponding to FIG. 2 to FIG. 6, after the UE receives the format configuration indicated by the first indication information sent by the gNB in the unlicensed spectrum, the UE determines the available time unit of the UE based on the format configuration indicated by the first indication information, and further generates the corresponding feedback information. In addition, the UE feeds back the feedback information to the gNB in the unlicensed spectrum, such that the gNB can perform scheduling for data transmission of the terminal based on the available time unit of the UE in the feedback information, thereby reducing incorrect scheduling by the gNB in the unlicensed spectrum band of the 5G mobile communications system, and improving data transmission efficiency in the unlicensed spectrum band.

In the embodiments in FIG. 2 to FIG. 6, in step 205, step 305, step 405, step 505, and step 605, the gNB performs scheduling for data transmission of the UE based on the feedback information fed back by the UE. Based on the time unit in the feedback information and a time unit corresponding to the format configuration indicated by the first indication information, a scheduling manner may include the following two data scheduling manners.

In a first data scheduling manner, when an intersection set between the format configuration of the one or more time units in the first time duration indicated by the first indication information and a format configuration corresponding to an available time unit of the UE in the feedback information is greater than a preset threshold, after receiving the feedback information of the UE, the gNB performs scheduling for data transmission of the UE based on the format configuration corresponding to the available time unit of the UE in the feedback information. It may be understood that, in this case, signal interference from surrounding UE to the UE is relatively slight, and the gNB may directly perform data scheduling based on the available time unit of the UE that is fed back by the UE. It also indicates that the format configuration included in the first indication information is applicable to the UE. In this case, when the UE suffers relatively strong signal interference from the surrounding UE, the gNB performs data scheduling in the following second data scheduling manner.

In the second data scheduling manner, when the intersection set between the format configuration of the one or more time units in the first time duration indicated by the first indication information and the format configuration corresponding to the available time unit of the UE in the feedback information is less than the preset threshold, such a case occurs in one or more feedbacks of one or more UEs. After receiving the feedback information of the UE, the gNB delivers second indication information to the UE. The second indication information is used to indicate a format configuration of a time unit in third time duration. For example, third indication information may be an identifier of the format configuration of the time unit in the third time duration. The third time duration is less than second time duration. A sending time of the second indication information is a start moment of the second time duration, namely, a start moment of a maximum channel occupancy time of the gNB, or is before a start moment of a maximum channel occupancy time of the gNB. Optionally, if the gNB divides the maximum channel occupancy time into a preparation phase and a data transmission phase, the sending time of the second indication information is a start moment of the data transmission phase, or is in the preparation phase. The first indication information is sent in the preparation phase. The sending time of the second indication information is later than a sending moment of the first indication information. Optionally, the format configuration of the time unit in the third time duration may be determined by the gNB based on the format configuration of the one or more time units in the first time duration and the format configuration of the available time unit of the UE.

The second indication information may be understood as an update to the first indication information. It may be learned from the name that the second indication information indicates a new format configuration that is different from the format configuration indicated by the first indication information. For example, the update to the first indication information may be an update to the granularity in the available time unit fed back by the terminal. For example, scheduling is performed in a time unit whose granularity is less than that of the time unit indicated by the first indication information. Alternatively, the update to the first indication information may be an indication of a format configuration of the terminal in a new time unit/time segment, such that other time domain resources are allocated to the terminal for scheduling.

The format configurations in Table 1 are used as examples. For example, the identifier carried in the first indication information is entry index=0, indicating the format configuration 1: Y1 downlink mini-slots, Q1 OFDM symbols in an unknown direction, and Y2 uplink mini-slots. For ease of description, it is assumed that Y1 is 2, Q1 is 0, Y2 is 2, and a mini-sequence includes four consecutive OFDM symbols. To be more specific, the format configuration indicated by the first indication information is two downlink mini-slots and two uplink mini-slots, and the second indication information carries indexes of two downlink mini-slots and indexes of two uplink mini-slots. The first indication information indicated by the feedback information of the terminal indicates that: in both the two downlink mini-slots and the two downlink mini-slots, the third OFDM symbol and the fourth OFDM symbol in the first mini-slot are available, the first OFDM symbol and the second OFDM symbol in the second mini-slot are available, and remaining OFDM symbols are all unavailable. In this case, the network device updates the first indication information using a time unit that has a smaller granularity and is indicated by the second indication information. For example, the format configuration indicated by the second indication information may be four downlink OFDM symbols and four downlink OFDM symbols. The second indication information includes indexes of the four downlink OFDM symbols and indexes of the four downlink OFDM symbols.

It should be noted that, in this application, meanings of the entry index, the identifier, and the entry are the same, and may be replaced with each other, or may be replaced with another similar name. This is not limited in this application.

Optionally, in an implementation, the second indication information may include the identifier of the format configuration of the time unit in the third time duration. The identifier of the format configuration of the time unit in the third time duration is similar to the identifier of the format configuration of the one or more time units in the first time duration. Details are not described herein again.

The second indication information is similar to the first indication information. For other descriptions of the first indication information, refer to the related descriptions of the first indication information in step 203. Details are not described herein again.

In the foregoing embodiment, in the data preparation phase, the gNB indicates a time domain structure configuration or an SFI format configuration in a transmission direction to the UE using the first indication information, and the UE determines an available time unit/time segment based on the time domain structure configuration or the SFI format configuration delivered by the gNB. In this way, the terminal learns of the time domain resource in the data transmission phase in advance, such that the UE does not need to perform continuous monitoring on the time domain resource, where the continuous monitoring causes a waste of energy. Therefore, energy of the UE is saved.

Further, after the gNB learns of the available time unit reported by the UE, the gNB may perform proper scheduling based on the available time domain resource fed back by the UE, to avoid incorrect scheduling and reduce signal interference from another UE and another network device.

It should be noted that in all embodiments of this application, names of the messages between the communications devices or names of parameters in the messages are merely examples, and may also be other names during implementation. For example, an update message may also be referred to as an indication message, an identifier may also be referred to as an index, and detection may also be referred to as measurement. A general description is provided herein, and this is not specifically limited in the embodiments of this application.

To facilitate understanding of the information transmission method in the embodiments of this application, the following describes the information transmission method in the embodiments of this application in detail with reference to an application scenario diagram.

Figure 7:
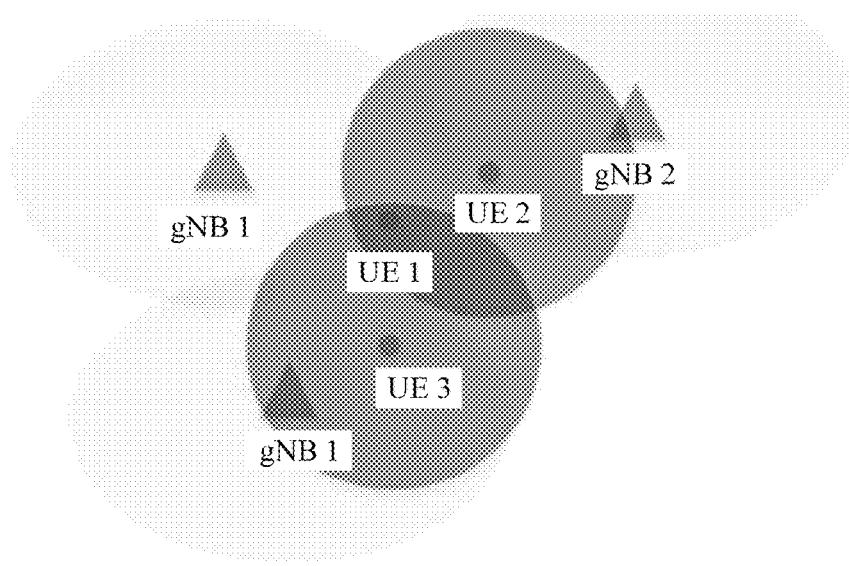
FIG. 7 is a schematic diagram of a scenario in which user equipment (UE) devices interfere with each other according to an embodiment of this application.

FIG. 7 is a schematic diagram of a scenario in which UEs interfere with each other according to an embodiment of this application.

As shown in FIG. 7, a gNB 1, gNB 2, gNB 3, UE 1, UE 2, and UE 3 are included. The gNB 1 is a base station that provides a network service for the UE 1, the gNB 2 is a base station that provides a network service for the UE 2, and the gNB 3 is a base station that provides a network service for the UE 3. The UE 1 is not only in coverage of the UE 2 but also in coverage of the UE 3. In other words, the UE 1 is interfered by both the UE 2 and the UE 3.

Figure 8:
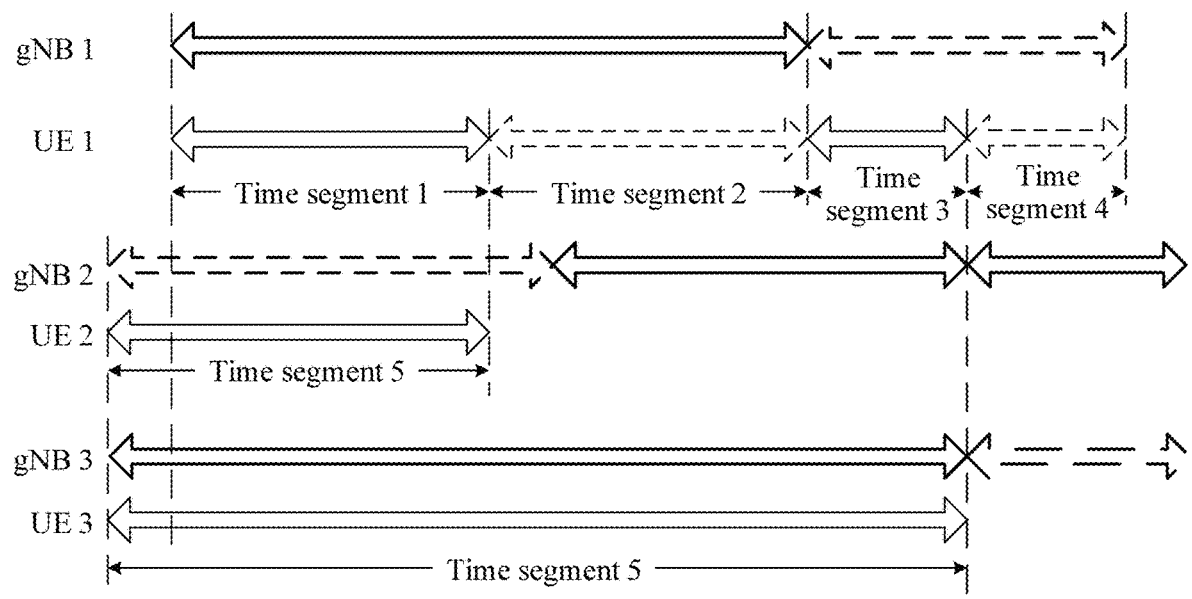
FIG. 8 is a schematic diagram of an SFI indicator of mutual interference between UEs according to an embodiment of this application.

FIG. 8 is a schematic diagram of an SFI indicator of mutual interference between UEs according to an embodiment of this application.

As shown in FIG. 8, a bold solid arrow represents a COT in which a gNB indicates UE to send data, and a bold dashed arrow represents a COT in which the gNB indicates the UE to receive data, a normal solid arrow of the UE 2 represents a time segment (namely, the time segment 5 in FIG. 8) that is determined by the UE 2 based on a channel detection result and an SFI indicated by the gNB 2 and that can be used by the UE 2 for uplink transmission, and a normal solid arrow of the UE 3 represents a time segment (namely, the time segment 6 in FIG. 8) that is determined by the UE 3 based on channel detection and an SFI indicated by the gNB 3 and that can be used by the UE 3 for downlink transmission. The gNB 1 delivers an SFI indicator to the UE 1. The SFI indicates that the UE 1 performs downlink data transmission in two consecutive time segments 1 and 2, and performs uplink data transmission in two consecutive time segments 3 and 4. The UE 1 is interfered by both the UE 2 and the UE 3. The UE 2 needs to perform uplink data transmission in the time segment 5, and this causes interference to downlink data transmission performed by the UE 1 in the time segment 1. Consequently, the time segment 1 is unavailable. The UE 3 needs to perform downlink data transmission in the time segment 6, and this causes interference to uplink data transmission performed by the UE 1 in the time segment 3. Consequently, the time segment 3 is unavailable. Therefore, the UE 1 finally determines the time segment 2 and the time segment 4 in the SFI indicator delivered by the gNB 1 as available time segments of the UE 1, generates corresponding feedback information, and reports the feedback information to the gNB 1.

The foregoing mainly describes, in terms of interaction between various communications devices, the solutions provided in the embodiments of this application. It may be understood that to implement the foregoing functions, the foregoing network device and terminal include corresponding hardware structures and/or software modules for implementing the functions. A person skilled in the art should be aware that, in combination with modules and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of a hardware structure, the network device 101 or the terminal 102 in FIG. 1 may be implemented by a physical device, may be implemented jointly by a plurality of physical devices, or may be a logical function module inside a physical device. This is not specifically limited in the embodiments of this application.

Figure 9:
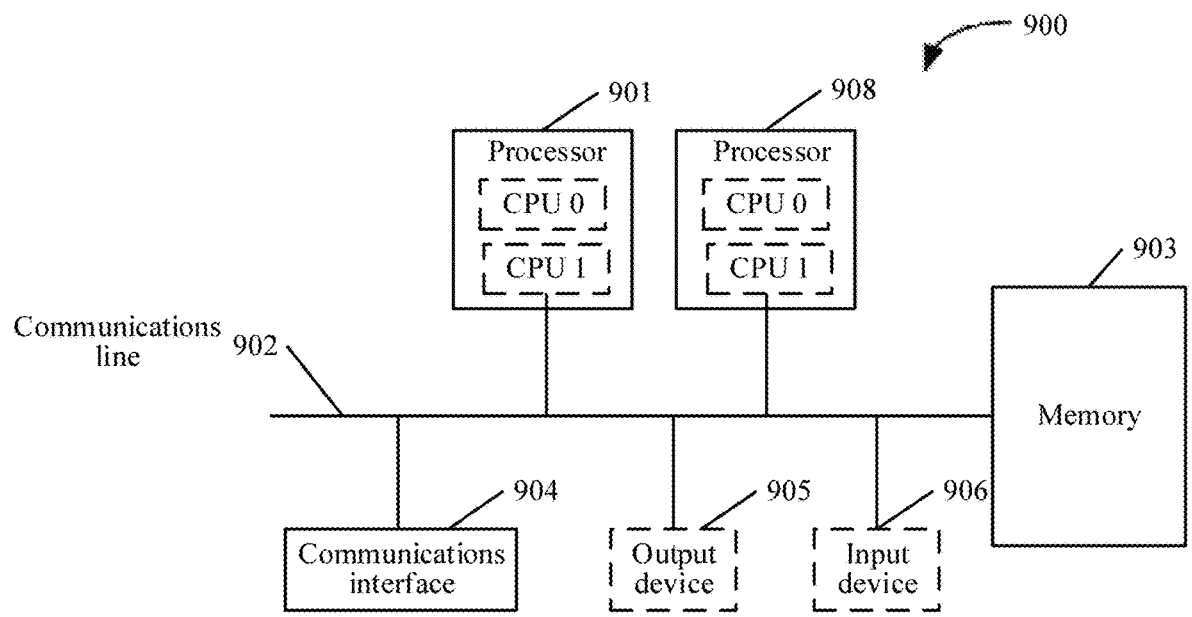
FIG. 9 is a schematic diagram of a hardware structure of a communications device according to an embodiment of this application.

For example, the network device 101 or the terminal 102 in FIG. 1 may be implemented by a communications device in FIG. 9. FIG. 9 is a schematic diagram of a hardware structure of a communications device according to an embodiment of this application. The communications device 900 includes at least one processor 901, a communications line 902, a memory 903, and at least one communications interface 904.

The processor 901 may be a general-purpose central processing unit (CPU), a microprocessor, an application-specific integrated circuit (ASIC), or one or more integrated circuits configured to control program execution of the solutions of this application.

The communications line 902 may include a path for transmitting information between the foregoing components.

The communications interface 904 is an apparatus using any transceiver, and is configured to communicate with another device or communications network such as the Ethernet, a radio access network (RAN), or a wireless local area network (WLAN).

The memory 903 may be a read-only memory (ROM) or another type of static storage device that can store static information and an instruction, or a random-access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory may exist independently, and is connected to the processor through the communications line 902. The memory may alternatively be integrated with the processor.

The memory 903 is configured to store a computer execution instruction for executing the solutions in this application, and the processor 901 controls execution of the computer execution instruction. The processor 901 is configured to execute the computer execution instruction stored in the memory 903, to implement the information transmission method provided in the foregoing embodiments of this application.

Optionally, the computer execution instruction in this embodiment of this application may also be referred to as application program code. This is not specifically limited in this embodiment of this application.

During implementation, in an embodiment, the processor 901 may include one or more CPUs, for example, a CPU 0 and a CPU 1 in FIG. 8.

During implementation, in an embodiment, the communications device 900 may include a plurality of processors, for example, the processor 901 and a processor 908 in FIG. 9. Each of the processors may be a single-core (single-CPU) processor or a multi-core (multi-CPU) processor. The processor herein may be one or more devices, circuits, and/or processing cores for processing data (for example, a computer program instruction).

During implementation, in an embodiment, the communications device 900 may further include an output device 905 and an input device 906. The output device 905 communicates with the processor 901, and may display information in a plurality of manners. For example, the output device 905 may be a liquid crystal display (LCD), a light emitting diode (LED) display device, a cathode ray tube (CRT) display device, a projector, or the like. The input device 906 communicates with the processor 901, and may receive an input of a user in a plurality of manners. For example, the input device 906 may be a mouse, a keyboard, a touchscreen device, a sensing device, or the like.

The communications device 900 may be a general-purpose device or a dedicated device. During implementation, the communications device 900 may be a desktop computer, a portable computer, a network server, a palmtop computer, a personal digital assistant (PDA), a mobile phone, a tablet computer, a wireless terminal device, an embedded device, or a device with a structure similar to the structure in FIG. 8. A type of the communications device 900 is not limited in this embodiment of this application.

In the embodiments of this application, function modules of the network device and terminal may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used.

Figure 10:
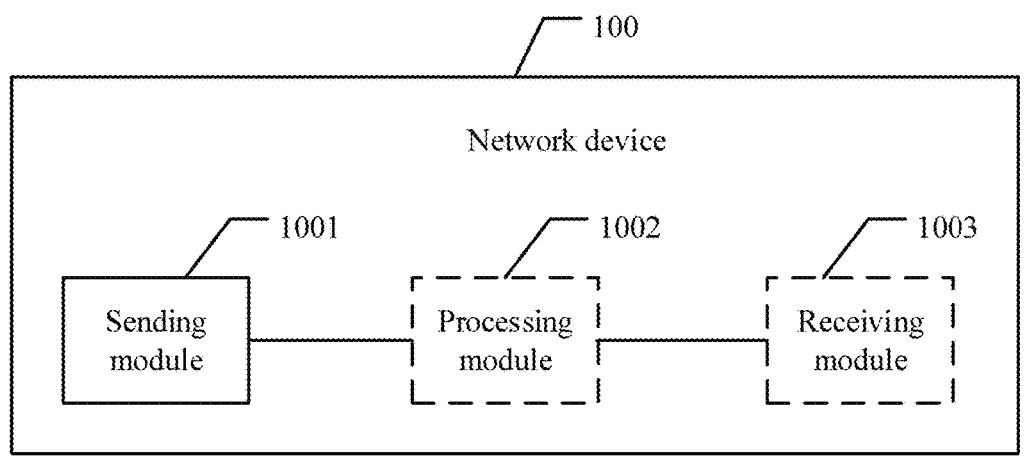
FIG. 10 is a schematic structural diagram of a network device according to an embodiment of this application.

For example, if the function modules are divided through integration, FIG. 10 is a schematic structural diagram of a network device.

As shown in FIG. 10, the network device 100 includes a sending module 1001. The sending module 1001 is configured to send first indication information to a terminal. The first indication information is used to indicate a format configuration of one or more time units in first time duration, the format configuration is a time domain structure configuration of the one or more time units in a transmission direction, the first time duration is not greater than second time duration, and the second time duration is a channel occupancy time of the network device. Optionally, the second time duration may be a maximum channel occupancy time of the network device, or may be an occupancy time less than a maximum occupancy time of the network device. This is not limited in this application.

Optionally, in an example, the network device 100 further includes a processing module 1002. The processing module 1002 is configured to generate the first indication information.

Optionally, in an example, the network device 100 further includes a receiving module 1003. The receiving module 1003 is configured to receive feedback information sent by the terminal. The feedback information is used to indicate at least one time unit determined by the terminal, and the at least one time unit determined by the terminal is determined based on the format configuration indicated by the first indication information.

That the at least one time unit determined by the terminal is determined based on the format configuration indicated by the first indication information may be understood as that the feedback information indicates at least one available or allowed time unit of the terminal. The at least one time unit is determined based on the format configuration indicated by the first indication information, the at least one time unit corresponds to the format configuration indicated by the first indication information, the at least one time unit meets the format configuration indicated by the first indication information, or a format configuration of the at least one time unit is a subset of the format configuration indicated by the first indication information.

Optionally, in an example, the transmission direction includes at least one of the following: an uplink transmission direction, a downlink transmission direction, and an unknown transmission direction; the format configuration of the one or more time units in the first time duration includes: a quantity of all time units that are in the first time duration and arranged in chronological order and a transmission direction of each time unit; and the time unit includes at least one of the following: a subframe, a mini-subframe, a slot, a mini-slot, or an orthogonal frequency division multiplexing symbol.

Optionally, in an example, the first indication information includes an identifier of the format configuration of the one or more time units in the first time duration.

Optionally, in an example, the feedback information includes an indication bit and at least one time segment. The indication bit is used to indicate that the first time segment in the at least one time segment is available or unavailable. When the at least one time segment is two or more time segments, the time segments in the at least one time segment are alternately available or unavailable. Alternatively, the feedback information includes indication information of the time unit determined by the terminal. The indication information of the time unit determined by the terminal includes an identifier of the format configuration of the time unit determined by the terminal. Alternatively, the feedback information includes indication information of time duration determined by the terminal. The indication information of the time duration determined by the terminal includes a start moment and duration of the time duration determined by the terminal. Alternatively, the feedback information includes a first bitmap. Time duration corresponding to the first bitmap is equal to the first time duration, and the first bitmap is used to indicate whether each time unit in the first time duration is available or unavailable. Alternatively, the feedback information includes a second bitmap. Time duration corresponding to the second bitmap is less than the first time duration, and the second bitmap is used to indicate only an available time unit in the first time duration. Alternatively, the feedback information includes a level indication. The level indication is used to indicate a level of interference in each of the at least one time unit determined by the terminal, and the level of the interference is determined by the terminal based on a channel detection result.

Optionally, in an example, the sending module 1001 is further configured to send second indication information to the terminal. The second indication information is used to indicate a format configuration of a time unit in third time duration, the format configuration of the time unit in the third time duration is different from the format configuration of the one or more time units in the first time duration, and the third time duration is not greater than the second time duration.

Optionally, in an example, the receiving module 1003 is configured to receive the feedback information on a preset frequency resource. The feedback information is scrambled using a group common identifier.

Figure 11:
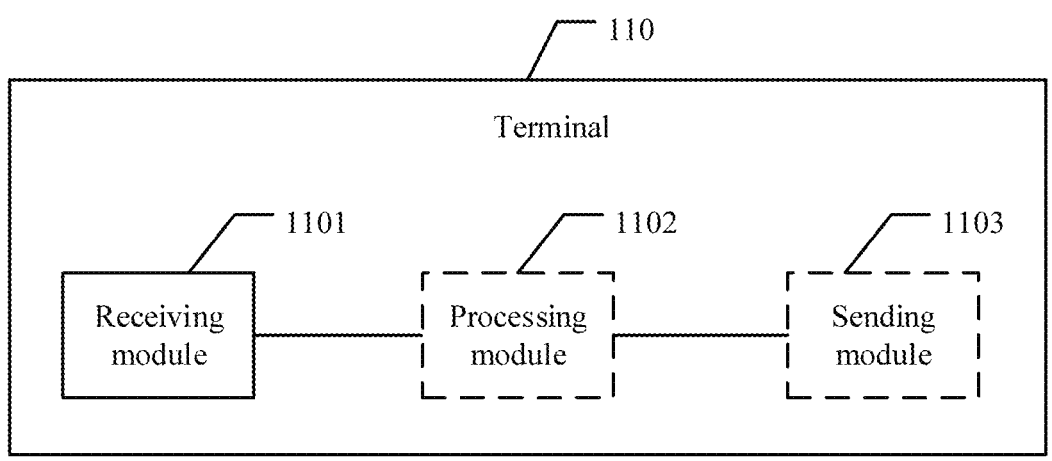
FIG. 11 is a schematic structural diagram of a terminal according to an embodiment of this application.

FIG. 11 is a schematic structural diagram of a terminal.

As shown in FIG. 11, the terminal 110 includes a receiving module 1101. The receiving module 1101 is configured to receive first indication information sent by a network device. The first indication information is used to indicate a format configuration of one or more time units in first time duration, the format configuration is a time domain structure configuration corresponding to the one or more time units, the first time duration is not greater than second time duration, and the second time duration is a channel occupancy time of the network device. Optionally, the second time duration may be a maximum channel occupancy time of the network device, or may be an occupancy time less than a maximum occupancy time of the network device. This is not limited in this application.

Optionally, in an example, the terminal 110 further includes a sending module 1103. The sending module 1103 is configured to send feedback information. The feedback information is used to indicate at least one time unit determined by the terminal, and the at least one time unit determined by the terminal is determined based on the format configuration indicated by the first indication information.

That the at least one time unit determined by the terminal is determined based on the format configuration indicated by the first indication information may be understood as that the feedback information indicates at least one available or allowed time unit of the terminal. The at least one time unit is determined based on the format configuration indicated by the first indication information, the at least one time unit corresponds to the format configuration indicated by the first indication information, the at least one time unit meets the format configuration indicated by the first indication information, or a format configuration of the at least one time unit is a subset of the format configuration indicated by the first indication information.

Optionally, in an example, the transmission direction includes at least one of the following: an uplink transmission direction, a downlink transmission direction, and an unknown transmission direction; the format configuration of the one or more time units in the first time duration includes: a quantity of all time units that are in the first time duration and arranged in chronological order and a transmission direction of each time unit; and the time unit includes at least one of the following: a subframe, a mini-subframe, a slot, a mini-slot, or an orthogonal frequency division multiplexing symbol.

Optionally, in an example, the first indication information includes an identifier of the format configuration of the one or more time units in the first time duration.

Optionally, in an example, the feedback information includes an indication bit and at least one time segment. The indication bit is used to indicate that the first time segment in the at least one time segment is available or unavailable. When the at least one time segment is two or more time segments, the time segments in the at least one time segment are alternately available or unavailable. Alternatively, the feedback information includes indication information of the time unit determined by the terminal. The indication information of the time unit determined by the terminal includes an identifier of the format configuration of the time unit determined by the terminal. Alternatively, the feedback information includes indication information of time duration determined by the terminal. The indication information of the time duration determined by the terminal includes a start moment and duration of the time duration determined by the terminal. Alternatively, the feedback information includes a first bitmap. Time duration corresponding to the first bitmap is equal to the first time duration, and the first bitmap is used to indicate whether each time unit in the first time duration is available or unavailable. Alternatively, the feedback information includes a second bitmap. Time duration corresponding to the second bitmap is less than the first time duration, and the second bitmap is used to indicate only an available time unit in the first time duration. Alternatively, the feedback information includes a level indication. The level indication is used to indicate a level of interference in the time unit determined by the terminal, and the level of the interference is determined by the terminal based on a channel detection result.

Optionally, in an example, the receiving module 1101 is further configured to receive second indication information sent by the network device. The second indication information is used to indicate a format configuration of a time unit in third time duration, the format configuration of the time unit in the third time duration is different from the format configuration of the one or more time units in the first time duration, and the third time duration is not greater than the second time duration.

Optionally, in an example, the terminal 110 further includes a processing module 1102. The processing module 1102 is configured to generate the feedback information based on the format configuration of the one or more time units in the first time duration and a channel detection result. The sending module 1103 is configured to send the feedback information on a preset frequency resource. The feedback information is scrambled using a group common identifier.

All related content of the steps in the foregoing method embodiments may be cited in function descriptions of a corresponding function module, and details are not described herein again.

In the embodiments corresponding to FIG. 10 and FIG. 11, the network device 100 and the terminal 110 are presented with the function modules implemented through integration.

The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the network device 100 or the terminal 110 may be in the form shown in FIG. 9.

For example, the processor 901 in FIG. 9 may invoke the computer execution instruction stored in the memory 903, to enable the network device 100 and the terminal 110 to perform the information transmission methods in the foregoing method embodiments.

For example, functions/implementation processes of the sending module 1001, the processing module 1002, and the receiving module 1003 in FIG. 10, and the receiving module 1101, the processing module 1102, and the sending module 1103 in FIG. 11 may be implemented by the processor 901 in FIG. 9 by invoking the computer execution instruction stored in the memory 903. Alternatively, functions/implementation processes of the processing module 1002 in FIG. 10 and the processing module 1102 in FIG. 11 may be implemented by the processor 901 in FIG. 9 by invoking the computer execution instruction stored in the memory 903, and functions/implementation processes of the sending module 1001 and receiving module 1003 in FIG. 10 and the receiving module 1101 and sending module 1103 in FIG. 11 may be implemented through the communications interface 904 in FIG. 9.

The network device and the terminal provided in the embodiments of this application may be configured to perform the foregoing information transmission methods. Therefore, for technical effects that can be obtained by the network device and the terminal, refer to the foregoing method embodiments. Details are not described herein again.

In the foregoing embodiments, the network device and the terminal are presented with the function modules implemented through integration. Certainly, each function module of the network device and terminal may be obtained through division based on each function in the embodiments of this application. This is not specifically limited in the embodiments of this application.

Optionally, an embodiment of this application provides a chip system. The chip system includes a processor, configured to support a network device or a terminal in implementing the foregoing information transmission method. In a possible design, the chip system further includes a memory. The memory is configured to store a program instruction and data that are necessary for the network device or terminal. The chip system may include a chip, or may include a chip and another discrete device. This is not specifically limited in this embodiment of this application.

All or some of the foregoing embodiments may be implemented using software, hardware, firmware, or any combination thereof. When being implemented using the software, all or some of the embodiments may be implemented in a form of a computer program product.

The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the steps of the methods in the embodiments may be implemented by a program instructing relevant hardware. The program may be stored in a computer-readable storage medium. The storage medium may include an ROM, an RAM, a magnetic disk, an optical disc, or the like.

The information transmission method and the related apparatus provided in the embodiments of this application are described in detail above. The principles and implementations of the present disclosure are described herein through examples. The descriptions about the embodiments of this application are merely provided to help understand the methods and core ideas of this application. In addition, a person of ordinary skill in the art can make variations and modifications to the implementations and application scopes based on the ideas of this application. Therefore, the content of this specification shall not be construed as a limitation on this application.

What is claimed is:

1. A method applied to a terminal and comprising:
   determining, based on a format configuration indicated by a network device and information about surroundings of the terminal, available time units in the format configuration; and
   sending, to the network device, an uplink control information (UCI) on a preset frequency domain resource in an unlicensed spectrum,
   wherein the preset frequency domain resource is configured by the network device via higher-layer signaling,
   wherein the UCI comprises second indication information of the available time units, and
   wherein the second indication information indicates to the network device to perform scheduling for data transmission.

2. The method according to claim 1, wherein the second indication information is one of an identifier of the format configuration or an entry index of the format configuration.

3. The method according to claim 2, further comprising receiving a correspondence table from the network device, wherein the correspondence table comprises a correspondence between the identifier and the format configuration.

4. The method according to claim 3, wherein receiving the correspondence table comprises receiving the correspondence table via Radio Resource Control (RRC) signaling.

5. The method according to claim 3, wherein after the terminal receives the correspondence table, the method further comprises receiving, from the network device, first indication information indicating the format configuration.

6. The method according to claim 1, wherein the UCI further comprises a level indication, and wherein the level indication indicates to the network device to perform the scheduling for the data transmission.

7. The method according to claim 1, further comprising:
   detecting interference from at least one of a surrounding network device or a surrounding terminal device to obtain an interference detection result;
   setting, based on the interference detection result, a time unit of a plurality of time units as an available time unit when the time unit suffers interference that is less than a preset threshold, wherein the plurality of time units is indicated by first indication information received from the network device; and
   generating feedback information based on the available time unit, wherein the second indication information comprises the feedback information.

8. A method applied to a network device and comprising:
   sending a first indication information to a terminal device, wherein the first indication information indicates a format configuration to be used by the terminal device for determining available time units in the format configuration;
   receiving an uplink control information (UCI) on a preset frequency domain resource in an unlicensed spectrum, wherein the preset frequency domain resource is configured by the network device via higher-layer signaling, wherein the UCI comprises second indication information of the available time units, wherein the second indication information indicates to the network device to perform scheduling for data transmission; and
   scheduling the data transmission based on the second indication information.

9. The method according to claim 8, wherein the second indication information is an identifier of the format configuration or an entry index of the format configuration.

10. The method according to claim 9, further comprising sending a correspondence table to the terminal device, wherein the correspondence table comprises a correspondence between the identifier and the format configuration.

11. The method according to claim 10, wherein sending the correspondence table comprises sending the correspondence table via Radio Resource Control (RRC) signaling.

12. The method according to claim 8, wherein the UCI further comprises a level indication, and wherein the level indication indicates to the network device to perform the scheduling for the data transmission.

13. A communications apparatus, comprising:
    a processor; and
    a memory coupled to the processor and configured to store a computer execution instruction that, when executed by the processor, enable the communications apparatus to:
    determine, based on a format configuration indicated by a network device and information about surroundings of the communications apparatus, available time units in the format configuration; and
    send, to the network device, an uplink control information (UCI) on a preset frequency domain resource in an unlicensed spectrum,
    wherein the preset frequency domain resource is configured by the network device via higher-layer signaling,
    wherein the UCI comprises second indication information of the available time units, and
    wherein the second indication information indicates to the network device to perform scheduling for data transmission.

14. The communications apparatus according to claim 13, wherein the second indication information is an identifier of a formatthe format configuration or an entry index of the format configuration.

15. The communications apparatus according to claim 14, wherein the computer execution instruction, when executed by the processor, further enable the communications apparatus to receive a correspondence table from the network device.

16. The communications apparatus according to claim 15, wherein the correspondence table comprises a correspondence between the identifier and the format configuration.

17. The communications apparatus according to claim 16, wherein receiving the correspondence table comprises receiving the correspondence table via Radio Resource Control (RRC) signaling.

18. The communications apparatus according to claim 13, wherein the UCI further comprises a level indication.

19. The communications apparatus according to claim 18, wherein the level indication indicates to the network device to perform the scheduling for the data transmission.

20. The communications apparatus according to claim 13, wherein the computer execution instruction is further configured to, when executed by the processor, enable the communications apparatus to:
   detect interference from at least one of a surrounding network device or a surrounding terminal device to obtain an interference detection result;
   set, based on the interference detection result, a time unit of a plurality of time units as an available time unit when the time unit suffers interference that is less than a preset threshold, wherein the plurality of time units is indicated by first indication information received from the network device; and
   generate feedback information based on the available time unit, wherein the second indication information comprises the feedback information.

\* \* \* \* \*

UNITED STATES PATENT AND TRADEMARK OFFICE
CERTIFICATE OF CORRECTION

| | |
|---|---|
| PATENT NO. | : 11,895,696 B2 |
| APPLICATION NO. | : 17/169763 |
| DATED | : February 6, 2024 |
| INVENTOR(S) | : Lili Zhang and Jiayin Zhang |

It is certified that error appears in the above-identified patent and that said Letters Patent is hereby corrected as shown below:

In the Claims

Claim 14, Column 32, Line 58: "a formatthe format configuration or an entry index of the" should read "the format configuration or an entry index of the"

Signed and Sealed this
Second Day of April, 2024

Katherine Kelly Vidal
Director of the United States Patent and Trademark Office